(12) United States Patent
Kanda et al.

(10) Patent No.: US 11,032,465 B2
(45) Date of Patent: Jun. 8, 2021

(54) IMAGE PROCESSING APPARATUS, IMAGE PROCESSING METHOD, IMAGING APPARATUS, AND RECORDING MEDIUM

(71) Applicant: CANON KABUSHIKI KAISHA, Tokyo (JP)

(72) Inventors: Akihiko Kanda, Kawasaki (JP); Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 16/015,439

(22) Filed: Jun. 22, 2018

(65) Prior Publication Data

US 2019/0014264 A1    Jan. 10, 2019

(30) Foreign Application Priority Data

Jul. 10, 2017    (JP) .............................. JP2017-134707

(51) Int. Cl.
*H04N 5/232*    (2006.01)
*G06T 7/50*    (2017.01)
(Continued)

(52) U.S. Cl.
CPC ....... *H04N 5/232122* (2018.08); *G06T 5/002* (2013.01); *G06T 5/003* (2013.01);
(Continued)

(58) Field of Classification Search
CPC ....... H04N 5/232122; H04N 5/232125; H04N 5/23229; G06T 5/003; G06T 5/002; G06T 7/80; G06T 7/50; G06T 2207/20221
See application file for complete search history.

(56) References Cited

U.S. PATENT DOCUMENTS

| 4,410,804 A | 10/1983 | Stauffer |
| 2013/0182900 A1* | 7/2013 | Ishii .................... H04N 5/23212 382/103 |

(Continued)

FOREIGN PATENT DOCUMENTS

| EP | 1 085 751 B1 | 11/2012 |
| JP | 2001-083407 A | 3/2001 |
| JP | 2011-022796 A | 2/2011 |

OTHER PUBLICATIONS

Aaron Isaksen et al. "Dynamically Reparameterized Light Fields" SIGGRAPH'00 Proceedings of the 27th annual conference on Computer graphics and interactive techniques, 10 pgs (2000).

*Primary Examiner* — Jason A Flohre
(74) *Attorney, Agent, or Firm* — Cowan, Liebowitz & Latman, P.C.

(57) ABSTRACT

An imaging element of an imaging apparatus has a configuration in which a plurality of pixels provided with a plurality of photoelectric conversion units for receiving light fluxes transmitting each of different pupil partial regions of an image forming optical system are arrayed. A CPU performs control to acquire a plurality of viewpoint images corresponding to different pupil partial regions from the imaging element and to generate output images using an image processing unit. The CPU and the image processing unit sets a detection range of an image shift amount using a photographing condition of an input image and a conversion coefficient for a conversion an image shift amount to a defocus amount, generates an image shift amount distribution of the detection range on the basis of a plurality of viewpoint images, and generates an image shift difference amount distribution. Image processing in accordance with the image shift amount distribution is performed to generate refocused images as output images.

20 Claims, 23 Drawing Sheets

(51) Int. Cl.
   *G06T 7/80*       (2017.01)
   *G06T 5/00*       (2006.01)
(52) U.S. Cl.
   CPC ............... *G06T 7/50* (2017.01); *G06T 7/80* (2017.01); *H04N 5/23229* (2013.01); *H04N 5/232125* (2018.08); *G06T 2207/20221* (2013.01)

(56) References Cited

U.S. PATENT DOCUMENTS

| | | | | |
|---|---|---|---|---|
| 2015/0022691 A1* | 1/2015 | Matsunaga | .......... | H04N 5/2176 348/231.6 |
| 2015/0109518 A1* | 4/2015 | Ishii | ................ | H04N 5/23212 348/353 |
| 2015/0256737 A1* | 9/2015 | Saito | ............... | H04N 5/23212 348/349 |
| 2015/0264251 A1* | 9/2015 | Ito | ................ | H04N 5/23212 348/345 |
| 2016/0014397 A1* | 1/2016 | Konno | .............. | H04N 5/23212 348/49 |
| 2016/0248967 A1* | 8/2016 | Sasaki | ............. | H04N 5/232122 |

\* cited by examiner

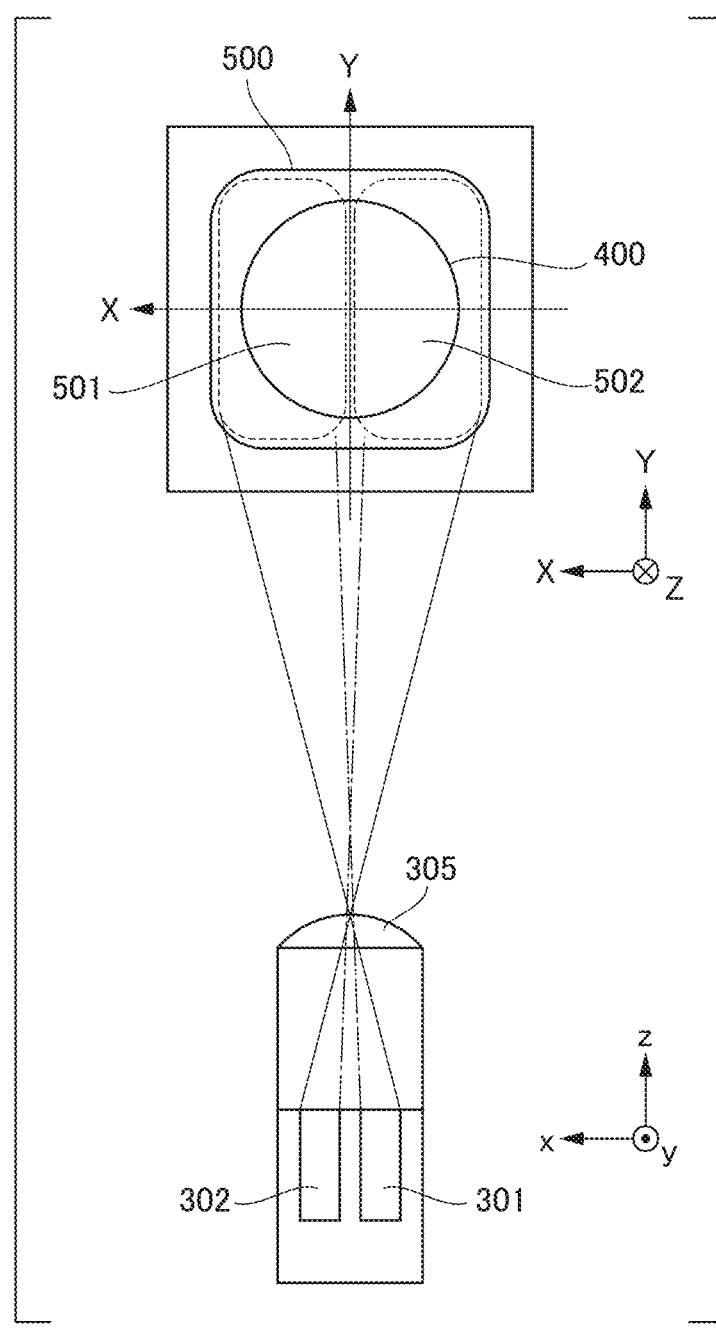

FOCAL POSITION

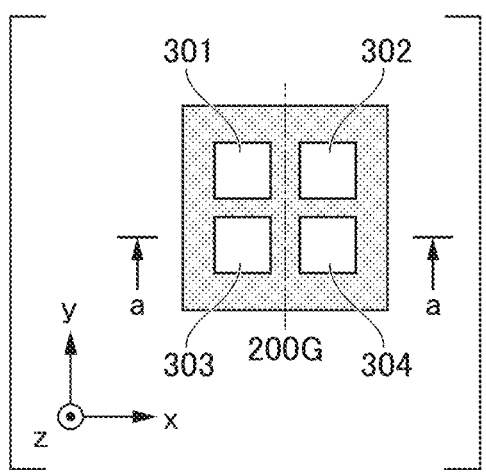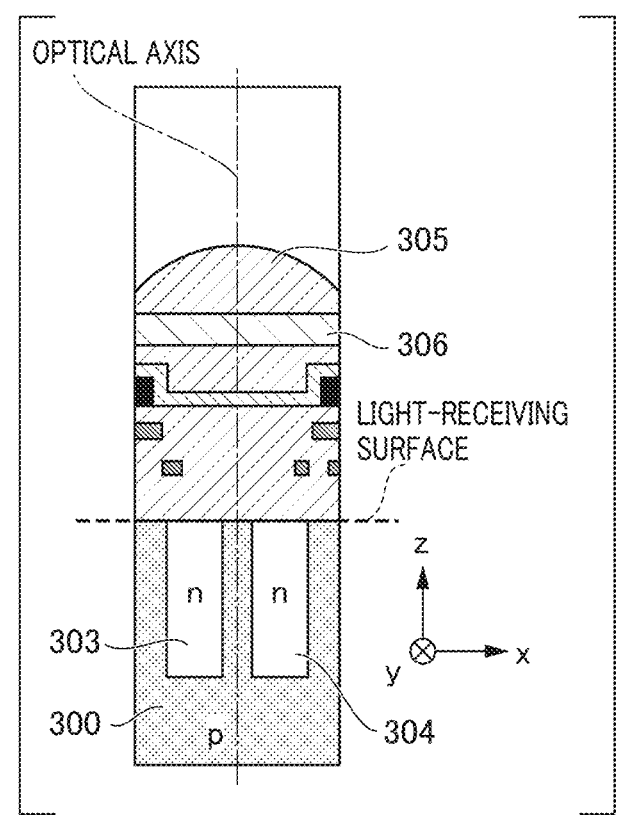

IMAGE PROCESSING APPARATUS, IMAGE PROCESSING METHOD, IMAGING APPARATUS, AND RECORDING MEDIUM

BACKGROUND OF THE INVENTION

Field of the Invention

The present invention relates to image processing of a plurality of viewpoint images.

Description of the Related Art

In an imaging surface phase difference method adopted in an imaging apparatus, focus detection of a phase difference method is performed by a focus detection pixel formed in an imaging element. The imaging apparatus disclosed in U.S. Pat. No. 4,410,804 uses a two-dimensional imaging element in which one microlens and a plurality of photoelectric conversion units are formed for one pixel. A plurality of divided photoelectric conversion units are configured to receive light from different regions of an exit pupil of a photographing lens via one microlens, and perform pupil division. A viewpoint signal is generated on the basis of a signal received by each photoelectric conversion unit. Focus detection of the phase difference method is performed by calculating an image shift amount on the basis of parallax between a plurality of viewpoint signals and converting it to a defocus amount. In Japanese Patent Laid-Open No. 2001-83407, it is disclosed that an imaging signal is generated by adding a plurality of viewpoint signals received by a plurality of divided photoelectric conversion units.

A plurality of viewpoint signals relating to a photographed image are equivalent to light field data which is information on a spatial distribution and an angular distribution of light intensity. In "SIGGRAPH'00 Proceedings of the 27th annual conference on Computer graphics and interactive techniques," p 297 to 306 (2000), a refocusing technique for synthesizing images on a virtual image forming surface different from the imaging surface using light field data, and changing an in-focus position of a captured image after photographing is disclosed.

A difference between a plurality of viewpoint images varies depending on a photographing condition such as a diaphragm value of the imaging optical system and a distance from an imaging apparatus to a subject. Therefore, if image processing such as sharpening and smoothing in refocusing processing in accordance with the difference between a plurality of viewpoint images is performed, and a processing range cannot be appropriately set for a subject, image quality may be degraded.

SUMMARY OF THE INVENTION

The present invention performs image processing of a plurality of viewpoint images while maintaining an image quality in accordance with photographing condition.

An apparatus according to an aspect of the present invention includes an acquisition unit configured to acquire a plurality of viewpoint images with different viewpoints, a first generation unit configured to set a detection range of an image shift amount of the plurality of viewpoint images on the basis of a photographing condition and to generate distribution information corresponding to an image shift amount of the detection range on the basis of the plurality of viewpoint images, and a second generation unit configured to perform image processing using the distribution information and to generate an output image.

Further features of the present invention will become apparent from the following description of exemplary embodiments with reference to the attached drawings.

BRIEF DESCRIPTION OF THE DRAWINGS

FIG. 4 is a schematic diagram which describes a pixel and pupil division in the first embodiment.

FIGS. 28A and 28B are a schematic plan view A and a schematic sectional view B in the third embodiment.

DESCRIPTION OF THE EMBODIMENTS

Hereinafter, illustrative embodiments of the present invention will be described in detail with reference to drawings. An embodiment in the case of application to an imaging apparatus such as a digital camera will be described, but it can be widely applied to an image processing apparatus, an information processing apparatus, electronic equipment, and the like which execute an image processing method according to the present invention.

First Embodiment

Figure 1:
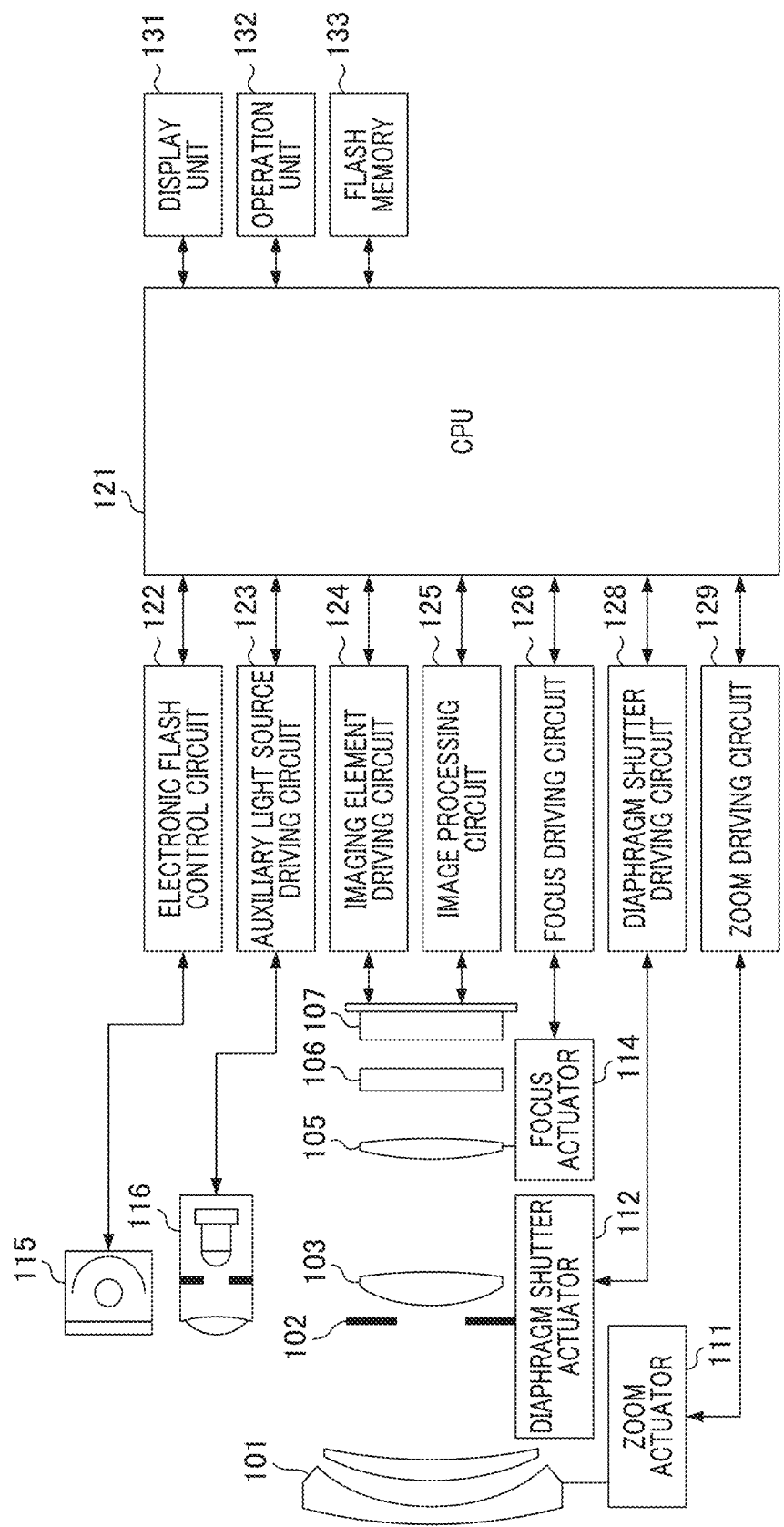
FIG. 1 is a schematic configuration diagram of an imaging apparatus according to a first embodiment.

As an application example of the image processing apparatus according to the first embodiment of the present invention, an overall configuration of the imaging apparatus will be described below. FIG. 1 is a block diagram which shows a configuration example of an imaging apparatus having an imaging element according to the present embodiment. Positional relationships of respective units will be described with a subject side as a front side.

A first lens group 101 is disposed at a front end of an imaging optical system (image forming optical system) and held by a lens barrel to be able to advance or retreat in an optical axis direction. A shutter also used as a diaphragm 102 adjusts an amount of light at the time of photographing by adjusting an aperture diameter thereof, and has a function as a shutter for adjusting exposure time at the time of photographing still images. A second lens group 103 is integrated with the shutter also used as a diaphragm 102 to advance or retreat in an optical axis direction, and performs a variable power operation to realize a zoom function by interlocking with an advancing or retreating operation of the first lens group 101. A third lens group 105 is a focus lens which performs focus adjustment by advancing or retreating in the optical axis direction.

An optical low pass filter 106 is an optical element for reducing false color and moiré of a photographed image. An imaging element 107 includes, for example, a two-dimensional CMOS (a complementary metal oxide semiconductor) photo sensor and a peripheral circuit, and is disposed on an image forming surface of the imaging optical system.

A zoom actuator 111 causes the first lens group 101 and a second lens group 103 to move in the optical axis direction and performs the variable power operation by rotating a cam barrel of a lens barrel. A diaphragm shutter actuator 112 controls an aperture diameter of the shutter also used as a diaphragm 102 to adjust the amount of light for photographing, and performs exposure time control at the time of photographing still images. A focus actuator 114 causes the third lens group 105 to move in the optical axis direction and performs a focus adjustment operation.

An electronic flash 115 for lighting a subject is used at the time of photographing, and a flash lighting device using a xenon tube or a lighting device including a light-emitting diode (LED) which continuously emits light is used. An auto-focus (AF) auxiliary light source 116 projects an image of a mask having a predetermined aperture pattern onto a field via a projection lens. Accordingly, a focus detection capability for low luminance subjects or low contrast subjects is improved.

A central processing unit (CPU) 121 constituting a control unit of a camera main body has a control center function for performing various types of control. The CPU 121 includes a calculation unit, a read-only memory (ROM), a random access memory (RAM), an analog to digital (A/D) converter, a D/A converter, a communication interface circuit, and the like. The CPU 121 drives various types of circuits in an imaging apparatus in accordance with a predetermined program stored in the ROM and executes a series of operations such as AF control, imaging processing, image processing, and recording processing. In the AF control, focus state detection and focus adjustment of the imaging optical system are controlled. The CPU 121 has a function of a data generation unit according to the present invention.

An electronic flash control circuit 122 controls lighting of the electronic flash 115 in synchronization with a photographing operation in accordance with a control command of the CPU 121. An auxiliary light source driving circuit 123 controls lighting of the AF auxiliary light source 116 in synchronization with a focus detection operation in accordance with a control command of the CPU 121. An imaging element driving circuit 124 controls an imaging operation of the imaging element 107, performs A/D conversion on an acquired imaging signal, and outputs it to the CPU 121.

An image processing circuit 125 performs processing such as gamma conversion, color interpolation, and Joint Photographic Experts Group (JPEG) compression of an image acquired by the imaging element 107 in accordance with a control command of the CPU 121.

A focus driving circuit 126 drives the focus actuator 114 on the basis of a result of the focus detection in accordance with a control command of the CPU 121, and performs focus adjustment by causing the third lens group 105 to move in the optical axis direction. A diaphragm shutter driving circuit 128 drives the diaphragm shutter actuator 112 in accordance with a control command of the CPU 121, and controls an aperture diameter of the shutter also used as a diaphragm 102. A zoom driving circuit 129 drives the zoom actuator 111 according to a zoom operation instruction of a photographer in accordance with a control command of the CPU 121.

A display unit 131 has a display device such as a liquid crystal display (LCD), and displays information on a photographing mode of an imaging apparatus, a preview image before photographing, a confirmation image after photographing, an in-focus state display image at the time of focus detection, and the like. An operation unit 132 includes various types of operation switches, and outputs an operation instruction signal to the CPU 121. A flash memory 133 is a recording medium that is detachable from a camera main body, and records photographed image data and the like. Predetermined image data is displayed on a screen of the display unit 131, or recorded in the flash memory 133. Predetermined image data includes, for example, data of a plurality of viewpoint image data which are imaged by the imaging element 107 and processed by the image processing circuit 125, or synthesized image data obtained by synthesizing data of a plurality of viewpoint images in the imaging element 107 or in the image processing circuit 125.

Figure 2:
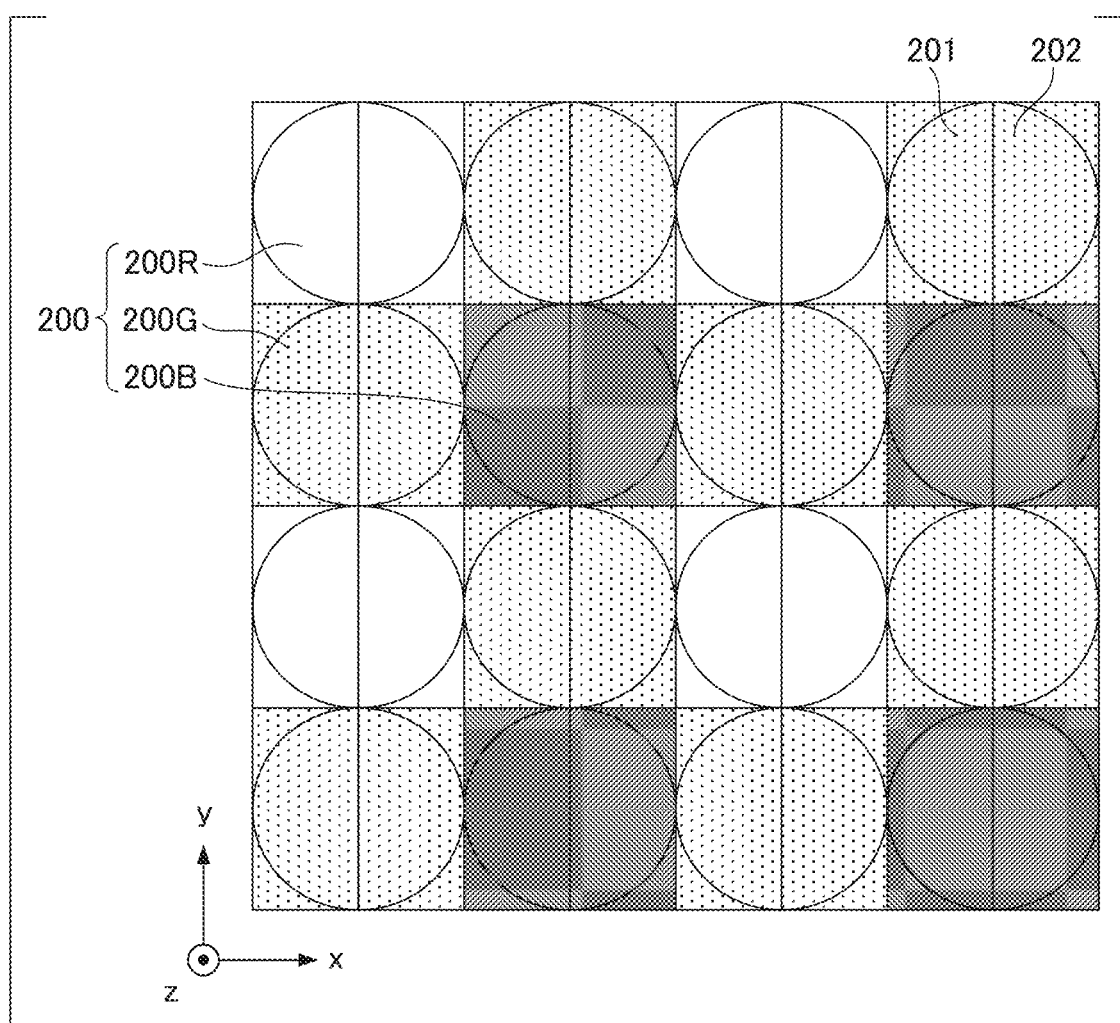
FIG. 2 is a schematic diagram of a pixel array in the first embodiment.

FIG. 2 is a schematic diagram which describes an array of pixels and sub-pixels of an imaging element. A horizontal direction of FIG. 2 is defined as an x direction (a horizontal direction), and a vertical direction is defined as a y direction (a vertical direction), and a direction orthogonal to the x direction and the y direction (a direction perpendicular to the paper surface) is defined as a z direction (an optical axis direction).

FIG. 2 shows an imaging pixel array of a two-dimensional CMOS sensor as an imaging element in a range of 4 columns×4 rows, and shows a sub-pixel array in a range of 8 columns×4 rows.

A pixel group 200 of 2 columns×2 rows shown in FIG. 2 is constituted by the following pixels 200R, 200G, and 200B.

A pixel 200R having spectral sensitivity of a first color R (red) positioned on the upper left.

A pixel 200G having spectral sensitivity of a second color G (green) positioned on the upper right and lower left.

A pixel 200B having spectral sensitivity of a third color B (blue) positioned on the lower right.

If the number of divisions in the x direction of FIG. 2 is set as Nx and the number of divisions in the y direction is set as Ny, the total number of divisions $N_{LF}$ is Nx×Ny. In the example of FIG. 2, Nx=2 and Ny=1, and one pixel section is configured by a first sub-pixel 201 and a second sub-pixel 202. An input image for generating a captured image (a synthesized image) and a viewpoint image with the number of divisions of two can be acquired from the imaging element 107 by disposing a great number of 4 columns×4 rows of pixels (8 columns×4 rows of sub-pixels) on the surface. In the imaging element of the present embodiment, a pixel period P is set to 4 μm (micrometer), and the number of pixels N is set to 5575 horizontal columns×3725 vertical rows=about 20.75 million pixels. In addition, a column direction period $P_S$ of the sub-pixels is set to 2 μm, and the number of sub-pixels $N_S$ is set to 11150 horizontal columns× 3725 vertical rows=about 41.50 million pixels. If the number of divisions is $N_{LF}$, pixel data from a first sub-pixel to an $N_{LF}^{th}$ sub-pixel can be acquired.

Figure 3A:
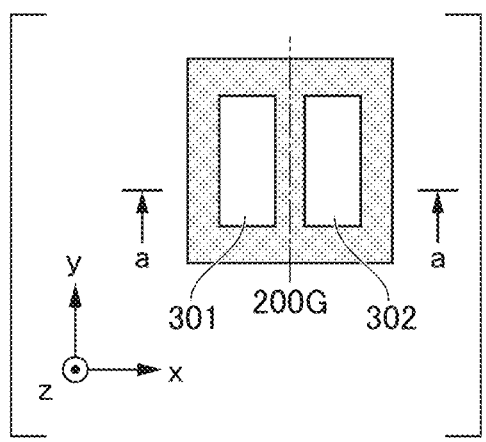
FIGS. 3A and 3B are a schematic plan view A and a schematic sectional view B in the first embodiment.
Figure 3B:
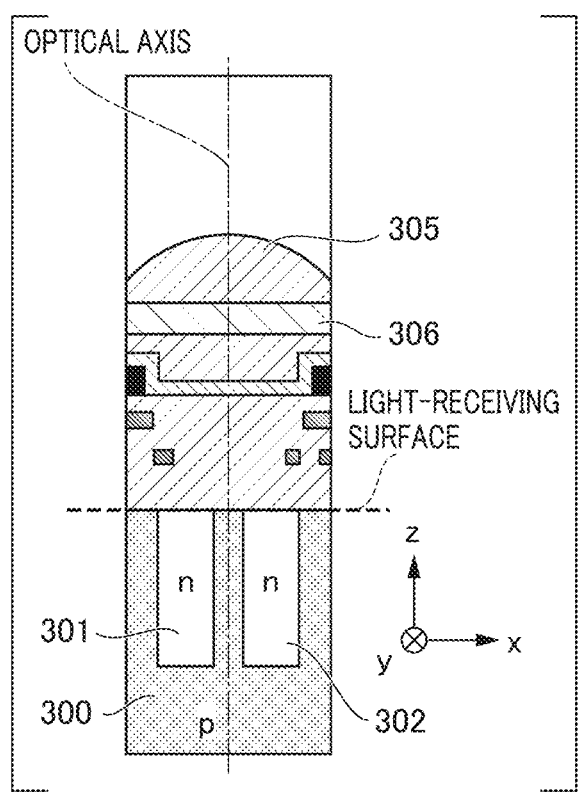

A structure of a pixel section will be described with reference to FIGS. 3A and 3B. FIG. 3A is a plan view when one pixel 200G in the imaging element 107 shown in FIG. 2 is viewed from a light receiving surface side (+z side) of the imaging element.

An axis of a direction perpendicular to the paper surface of FIG. 3A is defined as a z axis, and a near side is defined as a positive direction of the z axis. In addition, a vertical axis orthogonal to the z axis is defined as a y axis, and the upper direction is defined as a positive direction of the y axis. A horizontal axis orthogonal to the z axis and the y axis is defined as the x axis and the rightward direction is defined as a positive direction of the x axis. FIG. 3B is a cross-sectional view taken along the line a-a in FIG. 3A and viewed from the −y side.

In a pixel 200G, a microlens 305 for collecting incident light is formed on a light receiving surface side (+z direction) thereof. In addition, a first photoelectric conversion unit 301 and a second photoelectric conversion unit 302 corresponding to the first sub-pixel 201 and the second sub-pixel 202, respectively, are formed. When the number of divisions is $N_{LF}$, a first photoelectric conversion unit to an $N_{LF}^{th}$ photoelectric conversion units correspond to a first sub-pixel to an $N_{LF}^{th}$ sub-pixel, respectively.

Each of the photoelectric conversion units 301 and 302 has an independent pn junction photo diode, and is constituted by a p-type well layer 300, and two-divided n-type layers 301 and 302. When necessary, each of the photoelectric conversion units may be formed as a pin structure photo diode with an intrinsic layer interposed therebetween. In each pixel, a color filter 306 is formed between the microlens 305 and the first photoelectric conversion unit 301 and the second photoelectric conversion unit 302. When necessary, a spectral transmittance of the color filter 306 may be changed for each pixel or for each photoelectric conversion unit, or the color filter may be omitted.

Light incident on the pixel 200G is collected by the microlens 305, is further separated by the color filter 306, and is received by each of the first photoelectric conversion unit 301 and the second photoelectric conversion unit 302. In each photoelectric conversion unit, electrons and holes are generated in pair in accordance with an amount of received light and are separated by a depletion layer, and the electrons are accumulated. On the other hand, the holes are discharged outside the imaging element through a p-type well layer connected to a constant voltage source (not shown). The electrons accumulated in the first photoelectric conversion unit 301 and the second photoelectric conversion unit 302 are transferred to an electrostatic capacitance unit (FD) via a transfer gate and converted into a voltage signal.

FIG. 4 is a schematic diagram which describes a corresponding relationship between a pixel structure and a pupil division in the imaging element 107. On the lower side of FIG. 4, a cross-sectional view when a pixel structure shown in FIG. 3A is taken along line a-a and viewed from the +y direction is shown. On the upper side of FIG. 4, a view in which an exit pupil surface of the image forming optical system is viewed from a −Z direction is shown. The Z axis direction is the optical axis direction, a direction parallel to the x direction on the exit pupil surface is defined as an X direction, and a direction parallel to the y direction is defined as a Y direction. FIG. 4 shows a relationship between an x axis and a y axis in the cross-sectional view by inverting it from the state shown in FIGS. 3A and 3B to correspond to a coordinate axis of an exit pupil plane. The imaging element 107 is disposed near the image forming surface of the image forming optical system, and a light flux from a subject passes through the exit pupil 400 of the image forming optical system and is incident onto each pixel. A surface on which the imaging element 107 is disposed is set as an imaging surface.

A first pupil partial region 501 and a second pupil partial region 502 have, in general, an optically conjugated relationship with light receiving surfaces of the first photoelectric conversion unit 301 and the second photoelectric conversion unit 302 by a microlens, respectively. That is, the first pupil partial region 501 and the second pupil partial region 502 are pupil regions capable of receiving light using the first sub-pixel 201 and the second sub-pixel 202, respectively. The first pupil partial region 501 has a center of gravity biased toward the +X side on a pupil surface, and the second pupil partial region 502 has a center of gravity biased toward the −X side on the pupil surface.

A pupil region 500 and a light receiving surface in which all of the first photoelectric conversion unit 301 and the second photoelectric conversion unit 302 are combined have, in general, an optically conjugated relationship by a microlens. That is, the pupil region 500 is a pupil region capable of receiving light in the entire pixel 200G in which all of the first sub-pixel 201 and the second sub pixel 202 are combined. When the number of divisions is $N_{LF}$, the pupil region is divided into Nx×Ny, and is constituted by the first pupil partial region to the $N_{LF}^{th}$ pupil partial region.

Figure 5A:
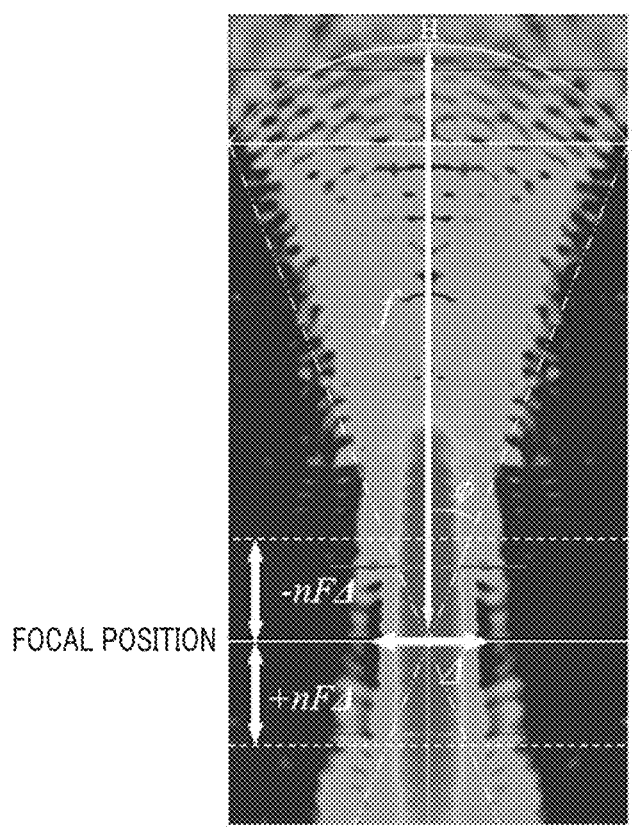
FIGS. 5A and 5B are diagrams which show examples of light intensity distribution inside a pixel in the first embodiment.
Figure 5B:
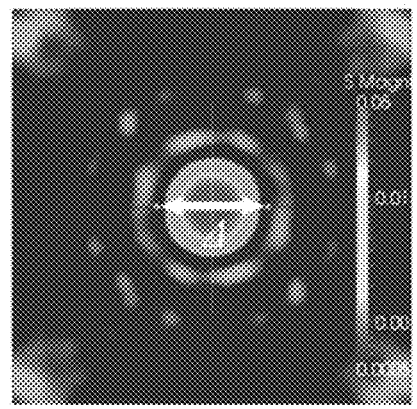

FIGS. 5A and 5B are cross-sectional views which illustrate a light intensity distribution when light is incident onto a microlens formed in each pixel. FIG. 5A shows a light intensity distribution in a cross-section parallel to the optical axis of the microlens. FIG. 5B shows a light intensity distribution in a cross-section perpendicular to the optical axis of the microlens in the focal position of the microlens. Incident light is collected at a focal position by the microlens. However, a diameter of a collecting spot cannot be made smaller than a diffraction limit A due to an influence of diffraction caused by fluctuation of light, and has a finite size. While a light receiving surface size of a photoelectric conversion unit is about 1 to 2 µm, a collection spot of the microlens is about 1 µm. For this reason, the first pupil partial region 501 and the second pupil partial region 502 of FIG. 4 which have a conjugated relationship with the light receiving surface of a photoelectric conversion unit via the microlens are not distinctly pupil-divided due to a diffraction blur. For this reason, a light-receiving rate distribution (a pupil intensity distribution) depending on an incident angle of light is obtained.

Figure 6:
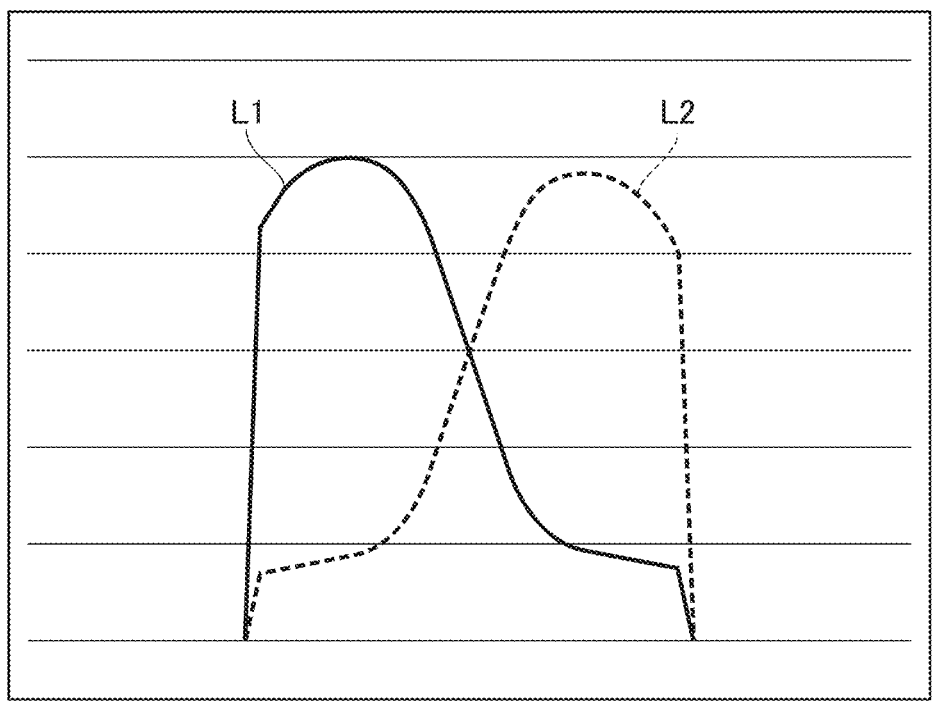
FIG. 6 is a diagram which shows an example of pupil intensity distribution in the first embodiment.

FIG. 6 shows an example of the light-receiving rate distribution (a pupil intensity distribution) depending on an incident angle of light. The horizontal axis represents pupil coordinates, and the vertical axis represents a light-receiving rate. A graph line L1 indicated by a solid line in FIG. 6 represents a pupil intensity distribution along the X axis of the first pupil partial region 501 of FIG. 4. A light-receiving rate indicated by the graph line L1 sharply rises from the left end, gradually decreases after reaching a peak, and reaches the right end with a slow rate of change. In addition, a graph line L2 indicated by a dashed line in FIG. 6 represents a pupil intensity distribution along the X axis of the second pupil partial region 502. A light-receiving rate indicated by the graph line L2, in contrast to the graph line L1, sharply rises from the right end, gradually decreases after reaching a peak, and reaches the left end with a slow rate of change. As shown in FIG. 6, it can be seen that pupil division is gently performed.

Figure 7:
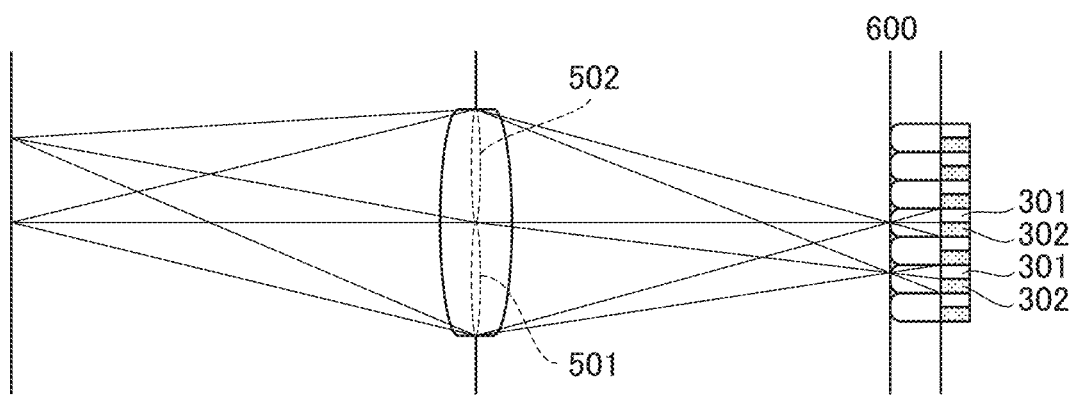
FIG. 7 is a schematic diagram which describes an imaging element and pupil division in the first embodiment.

FIG. 7 is a schematic diagram which shows a corresponding relationship between an imaging element and pupil division in the present embodiment. The imaging surface 600 is indicated by a line, and the first photoelectric conversion unit 301 and the second photoelectric conversion unit 302 correspond to the first sub-pixel 201 and the second sub-pixel 202, respectively. In each pixel of the imaging element, each of the first photoelectric conversion unit 301 and the second photoelectric conversion unit 302 receives a light flux which has passed through the first pupil partial region 501 and the second pupil partial region 502 of the image forming optical system. Light field data (an input image) indicating a spatial distribution and an angular distribution of light intensity is acquired from signals received by each photoelectric conversion unit. When the number of divisions is $N_{LF}$, light field data (hereinafter, denoted as LF data) can be acquired from each signal of a first sub-pixel to an $N_{LF}^{th}$ sub-pixel obtained by an Nx×Ny division.

In the LF data, processing of selecting a signal of a specific sub-pixel among a first sub-pixel 201 and a second sub-pixel 202 obtained by a division for each pixel is performed. It is possible to generate a viewpoint image corresponding to a specific pupil partial region between the first pupil partial region 501 and the second pupil partial region 502 of the image forming optical system. For example, it is possible to generate a first viewpoint image (or a second viewpoint image) having a resolution of the number of pixels N, which corresponds to the first pupil partial region 501 (or the second pupil partial region 502) by selecting a signal of the first sub-pixel 201 (or the second sub-pixel 202) for each pixel. The first viewpoint image and the second viewpoint image are images with different viewpoints. When the number of divisions is $N_{LF}$, it is possible to generate a first viewpoint image to an $N_{LF}^{th}$ viewpoint image.

In addition, in the LF data, it is possible to generate a captured image having a resolution of the number of pixels N by synthesizing all the signals of the first sub-pixel 201 and the second sub-pixel 202 obtained by a division for each pixel. When the number of divisions is $N_{LF}$, a captured image is generated by synthesizing signals of a first sub-pixel to an $N_{LF}^{th}$ sub-pixel.

As described above, an imaging element of the present embodiment has a structure in which a plurality of pixels provided with a plurality of photoelectric conversion units each for receiving a light flux passing through different pupil partial regions of the image forming optical system are arrayed, and can acquire LF data (an input image).

Next, a relationship between a defocus amount of a first viewpoint image and a second viewpoint image which are generated on the basis of LF data (an input image) acquired by an imaging element and an image shift amount will be described.

Figure 8:
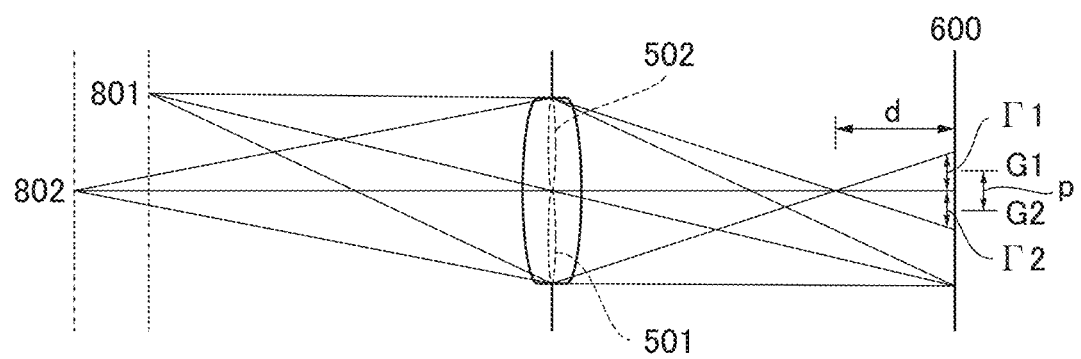
FIG. 8 is a schematic relationship diagram of a defocus amount and an image shift amount of a viewpoint image in the first embodiment.

FIG. 8 is a relationship diagram which schematically shows a defocus amount of a first viewpoint image and a second viewpoint image and an image shift amount between the first viewpoint image and the second viewpoint image. An imaging element (not shown) is disposed in the imaging surface 600, and, in the same manner as in FIGS. 4 and 7, an exit pupil of the image forming optical system is divided into two of the first pupil partial region 501 and the second pupil partial region 502.

A magnitude |d| of a defocus amount d represents a distance from an image formation position of a subject image to the imaging surface 600. A direction is defined with a front-pin state in which the image formation position of a subject image is closer to a subject side than the imaging surface 600 as a negative sign (d<0), and a post-pin state of the opposite as a positive sign (d>0). In an in-focus state in which an image formation position of a subject image is in an imaging surface (an in-focus position), d=0. A position of a subject 801 shown in FIG. 8 indicates a position corresponding to an in-focus state (d=0), and a position of a subject 802 indicates a position corresponding to a front-pin state (d<0). In the following, the front-pin state (d<0) and the post-pin state (d>0) are collectively referred to as a defocus state (|d|>0).

In the front-pin state (d<0), a light flux which has passed through the first pupil partial region 501 (or the second pupil partial region 502) among light fluxes from the subject 802 is collected once, and then spreads with a width Γ1 (or 2) around a center of gravity position G1 (or G2) of the light flux. In this case, a blurred image is formed on the imaging surface 600. The blurred image is received by the first sub-pixel 201 (or the second sub-pixel 202) constituting respective pixel sections arrayed in an imaging element, and the first viewpoint image (or the second viewpoint image) is generated. Therefore, the first viewpoint image (or the second viewpoint image) is stored in a memory as image data of a subject image (blurred image) having the width Γ1 (or Γ2) at the center of gravity position G1 (or G2) on the imaging surface 600. The width Γ1 (or Γ2) of a subject image increases substantially in proportion to an increase in the magnitude |d| of the defocus amount d. In the same manner, if an image shift amount of a subject image between the first viewpoint image and the second viewpoint image is written as "p," the size |p| increases as the size |d| of the defocus amount d increases. For example, the image shift amount p is defined as a difference in center of gravity position of the light flux "G1-G2," and the size |p| increases substantially in proportion to an increase in |d|. In the post-pin state (d>0), an image shift direction of a subject image between the first viewpoint image and the second viewpoint image is opposite to that in the front-pin state, but there is a similar tendency. Therefore, in the present embodiment, as the defocus amount of the first viewpoint image and the second viewpoint image, or a captured image obtained by adding the first viewpoint image and the second viewpoint image increases or decreases, a magnitude of the image shift amount between the first viewpoint image and the second viewpoint image increases.

In the present embodiment, refocusing processing which re-corrects a focus position after photographing is performed on the captured image using a relationship between the defocus amount and the image shift amount of a plurality of viewpoint images (first to $N_{LF}{}^{th}$ viewpoint images). Specifically, processing in which refocusing using shift synthesis processing using the first viewpoint image to the $N_{LF}{}^{th}$ viewpoint image and sharp/unsharp control are combined is executed. The sharp/unsharp control is control for adaptively performing image processing on a region with high sharpness and a region with a high blurring degree by sharpening and smoothing in accordance with an image shift difference amount distribution. However, only one of the refocusing processing and the sharp/unsharp control may be performed on an image. When either one is performed, steps of unnecessary processing in FIG. 9 may be omitted.

Figure 9:
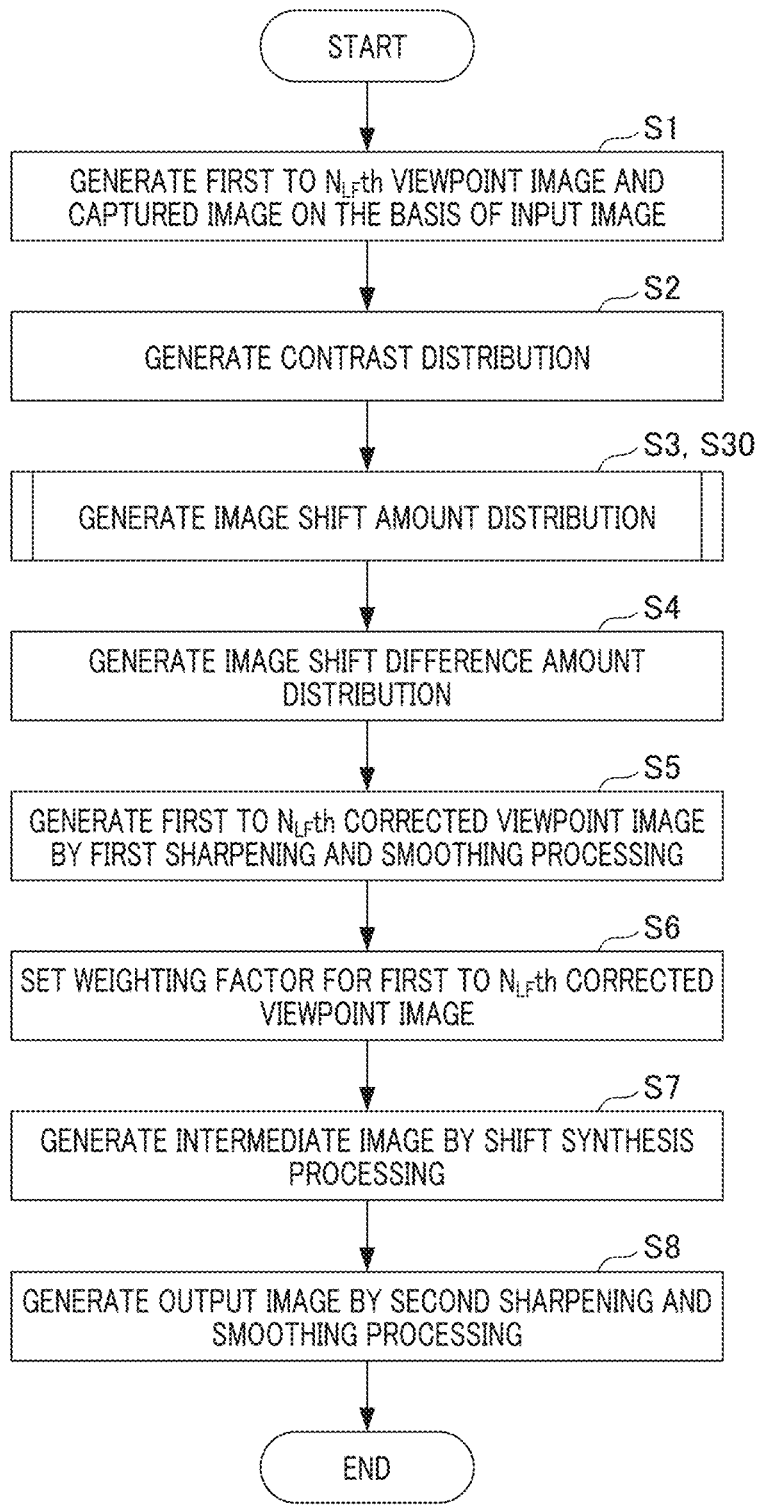
FIG. 9 is a flowchart of refocusing processing in the first embodiment.

With reference to FIG. 9, description will be provided using a schematic diagram of a flow of refocusing processing and sharp/unsharp control. Image processing to generate a processed image (an output image) in which a focus position and blur feeling have been corrected after photographing is performed, on the basis of LF data (an input image) acquired by an imaging element. The processing of FIG. 9 is executed by the CPU 121 and the image processing circuit 125.

In S1 of FIG. 9, a plurality of viewpoint images (a first viewpoint image to an $N_{LF}{}^{th}$ viewpoint image) are generated for each different pupil partial region of the image forming optical system on the basis of LF data acquired by the imaging element. A plurality of images with different viewpoints are referred to as multi-viewpoint images. In addition, captured images (synthesized images) corresponding to a pupil region in which different pupil partial regions of the image forming optical system are synthesized are generated.

Specifically, processing of acquiring LF data acquired by the imaging element 107 is first executed in S1. Alternatively, LF data captured by the imaging element 107 and stored in a recording medium in advance may also be read and used as input image data. Next, first viewpoint image to $N_{LF}{}^{th}$ viewpoint image data is generated for each different pupil partial region of the image forming optical system. The LF data (input image) is expressed as "LF." In addition, a sub-pixel signal on an $i_s{}^{th}$ column (1≤$i_s$≤Nx) and a $j_s{}^{th}$ row (1≤$j_s$≤Ny) in each pixel signal of the LF is set as a $k^{th}$ sub-pixel signal, where k is assumed to be Nx($j_s$−1)+$i_s$ (1≤k≤$N_{LF}$). If a $k^{th}$ viewpoint image on an $i^{th}$ column and a $j^{th}$ row which corresponds to a $k^{th}$ pupil partial region of the image forming optical system is expressed as Ik(j,i), this is generated by Equation (1).

$$I_k(j,i)=I_{N_x(j_S-1)+i_S}(j,i)=LF(N_y(j-1)+j_S, N_S(i-1)+i_S). \quad (1)$$

The present embodiment shows an example of division with Nx=2, Ny=1, and $N_{LF}$=2. Processing of selecting a specific sub-pixel signal from the first sub-pixel 201 and the second sub-pixel 202 obtained by a two-division in the x direction is performed for each pixel on the basis of LF data corresponding to a pixel array illustrated in FIG. 2. A first viewpoint image and a second viewpoint image which are RGB signals of a Bayer array having a resolution of the number of pixels N, which correspond to specific pupil partial regions in the first pupil partial region 501 and the second pupil partial region 502 of the image forming optical system, are generated.

Figure 11A:
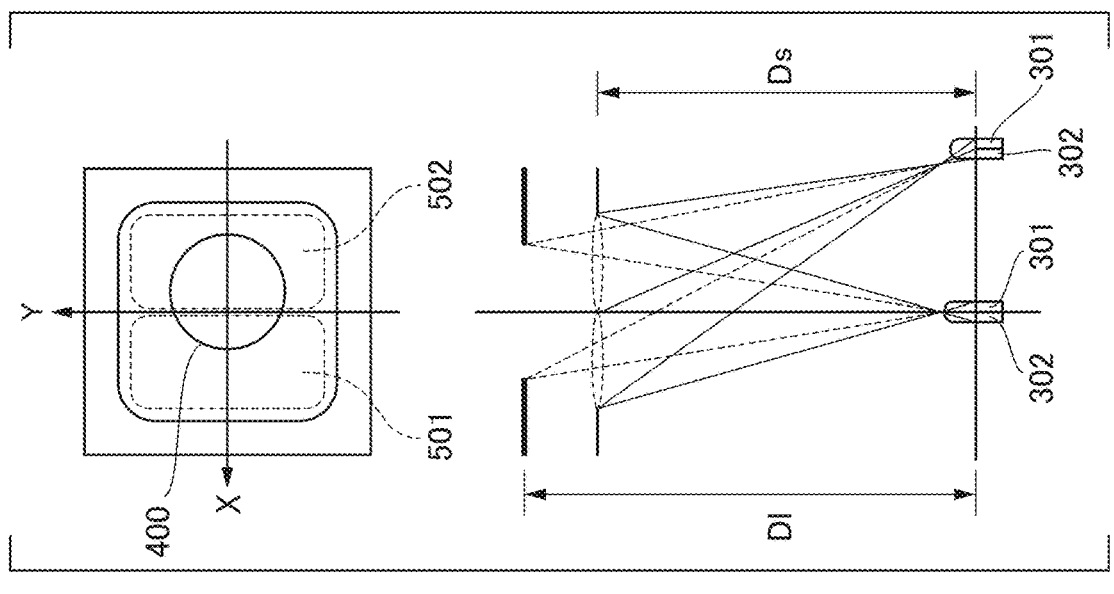
FIGS. 11A to 11C are diagrams which describe shading caused by the pupil shift in a first viewpoint image and a second viewpoint image.
Figure 11B:
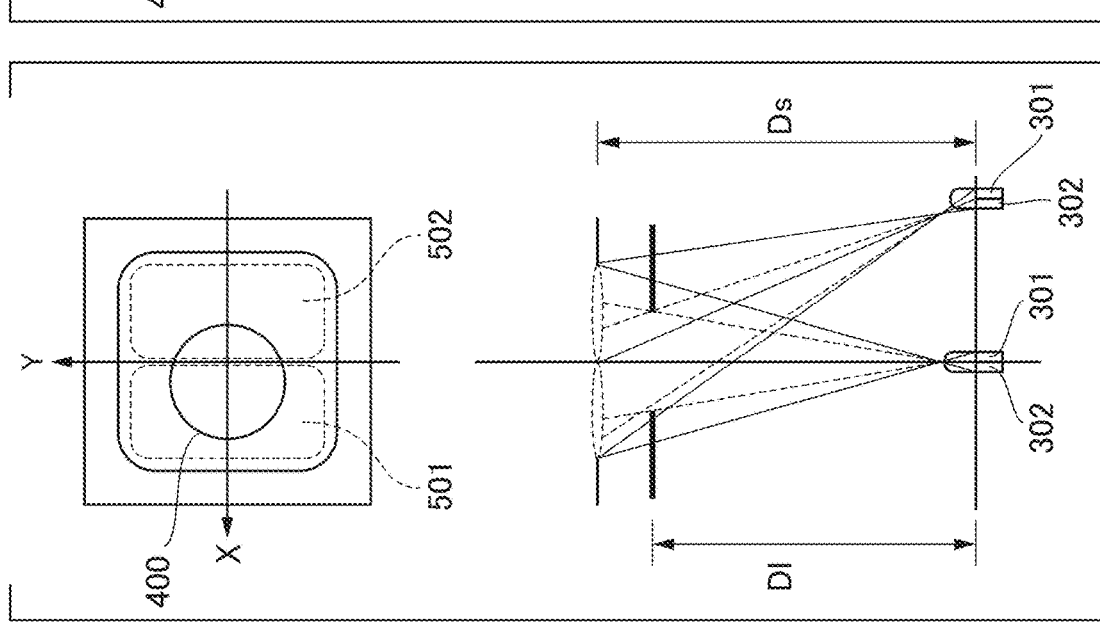
Figure 11C:
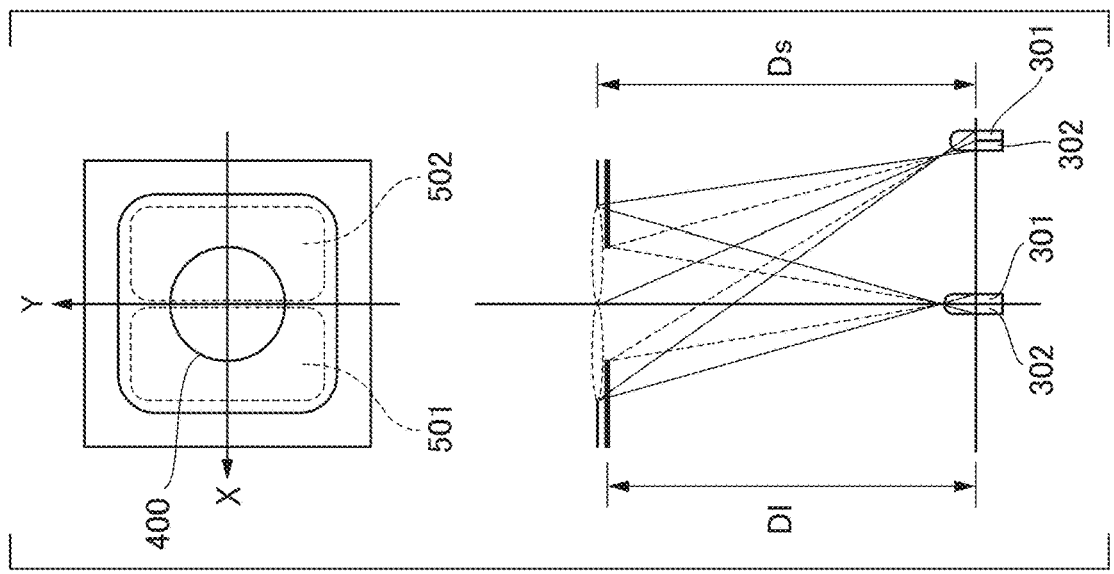

Here, shading by pupil shifts of the first viewpoint image and the second viewpoint image will be described. FIGS. 11A to 11C show a relationship of the first pupil partial region 501 received by the first photoelectric conversion unit 301, the second pupil partial region 502 received by the second photoelectric conversion unit 302, and the exit pupil 400 of the image forming optical system at a peripheral image height of the imaging element. The same parts as in FIG. 4 are denoted by the same reference numerals. The first photoelectric conversion unit 301 and the second photoelectric conversion unit 302 correspond to the first sub-pixel 201 and the second sub-pixel 202, respectively. An exit pupil distance of the image forming optical system is expressed as D1, and a set pupil distance of the imaging element is expressed as Ds.

FIG. 11A shows a case in which the exit pupil distance D1 of the image forming optical system is equal to a set pupil distance Ds of the imaging element. In this case, the exit pupil 400 of the image forming optical system is substantially evenly pupil-divided by the first pupil partial region 501 and the second pupil partial region 502. In contrast, FIG. 11B shows a case in which the exit pupil distance D1 of the image forming optical system is shorter than the set pupil distance Ds of the imaging element. In this case, there are pupil shifts of the exit pupil of the image forming optical system and an entrance pupil of the imaging element at the peripheral image height of the imaging element, and the exit pupil 400 of the image forming optical system is unevenly pupil-divided. FIG. 11C shows a case in which the exit pupil distance D1 of the image forming optical system is longer than the set pupil distance Ds of the imaging element. In this case, there are pupil shifts of the exit pupil of the image forming optical system and the entrance pupil of the imaging element at the peripheral image height of the imaging element, and the exit pupil 400 of the image forming optical system is unevenly pupil-divided. As a pupil division becomes uneven at the peripheral image height, an intensity of the first viewpoint image and the second viewpoint image becomes uneven. Shading in which the intensity of any one of the first viewpoint image and the second viewpoint image increases and the intensity of the other decreases occurs for each of RGB colors.

Shading correction processing (optical correction processing) is performed on the first viewpoint image to the $N_{LF}{}^{th}$ viewpoint image for each of RGB colors to improve shading of each viewpoint image. In addition, scratching correction processing, saturation processing, demosaicing processing, or the like is performed when necessary.

A captured image (a synthesized image) is next generated in S1 of FIG. 9. The captured image is an image corresponding to a pupil region in which different pupil partial regions of the image forming optical system are synthesized. If a captured image on an $i^{th}$ column and $j^{th}$ row is expressed as I(j,i), this is generated by Equation (2).

$$I(j,i)=\sum_{k=1}^{N_{LF}} I_k(j,i) = \sum_{j_S=1}^{N_y}\sum_{i_S=1}^{N_x} LF(N_y(j-1)+j_S, N_x(i-1)+i_S). \quad (2)$$

Figure 12:
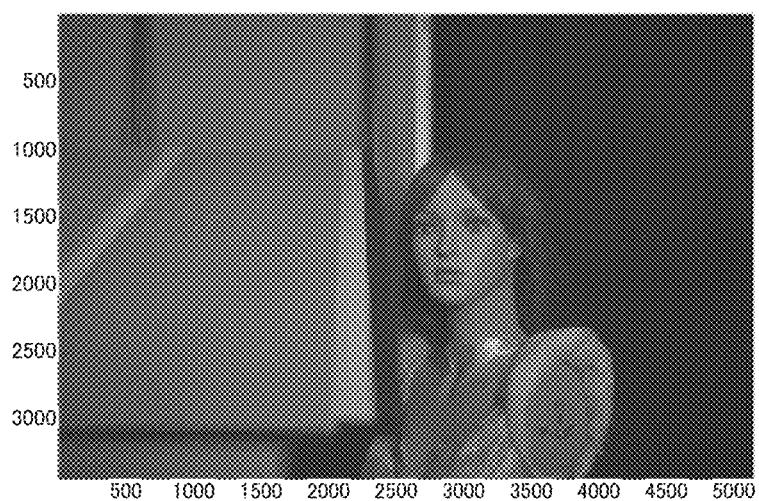
FIG. 12 is a diagram which illustrates a captured image of the first embodiment.

The present embodiment is an example of a division of $N_{LF}=2$ using $Nx=2$ and $Ny=1$. Processing of synthesizing all signals of the first sub-pixel 201 and the second sub-pixel 202 to generate a captured image which is an RGB signal of a Bayer array having a resolution of the number of pixels N is executed for each pixel on the basis of an input image (LF data) corresponding to the pixel array shown in FIG. 2. When necessary, shading correcting processing, scratch correction processing, saturation processing, demosaicing processing, or the like is performed. FIG. 12 shows a captured image subjected to demosaicing processing of the present embodiment. A doll which is a main subject is disposed at the center, and a fine checked flat plate is disposed on the left side to be inclined from the front to the inside.

As described above, a plurality of viewpoint images are generated for each different pupil partial region on the basis of an input image acquired by the imaging element obtained by arraying a plurality of pixels provided with a plurality of photoelectric conversion units for receiving light fluxes passing through each of different pupil partial regions of the image forming optical system. Furthermore, a captured image corresponding to a pupil region in which different pupil partial regions are synthesized is generated. If a plurality of viewpoint images and synthesized images of these can be acquired, the present invention can be applied to any apparatus having various imaging systems. As disclosed in Japanese Patent Laid-Open No. 2011-22796, in a configuration using a plurality of cameras with different viewpoints, it is possible to collectively regard the plurality of cameras as the imaging element 107. In addition, a light flux from the imaging optical system may be image-formed on a microlens array and the imaging element may be provided on an image forming surface such that an object plane and the imaging element have a conjugated relationship. Furthermore, there is a configuration in which the light flux from the imaging optical system is image re-formed on the microlens array (a light flux which is image-formed once is in a diffusing state and the light flux is image-formed again, and thus this is called image re-formation), and the imaging element is provided on the image forming surface. In addition, it is possible to use a configuration in which an appropriate patterned mask (a gain modulation element) is inserted into an optical path of the imaging optical system. The application of these configurations is the same in embodiments described below.

In S2 of FIG. 9, processing of extracting a high frequency band component of a spatial frequency for each region from each of a captured image (a synthesized image) and a plurality of viewpoint images, and generating a contrast distribution is performed. The contrast distribution of the present embodiment is adjusted in accordance with a difference between viewpoint images. Specifically, in S2, an imaging luminance signal $Y(j,i)$ is generated by the following equation (3A) by matching color centers of gravity of respective RGB colors for each position $(j,i)$ on the basis of a captured image $I(j,i)$ which is an RGB signal of the Bayer array. A $k^{th}$ viewpoint luminance signal $Y_k(j,i)$ is generated by the following equation (3B) for each position $(j,i)$ on the basis of a $k^{th}$ viewpoint image $I_k(j,i)$ ($k=1$ to $N_{LF}$) which is an RGB signal of the Bayer array.

$$Y(j, i) = \begin{pmatrix} I(j-1, i-1) & I(j-1, i) & I(j-1, i+1) \\ I(j, i-1) & I(j, i) & I(j, i+1) \\ I(j+1, i-1) & I(j+1, i) & I(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}, \quad (3A)$$

$$Y_k(j, i) = \begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}. \quad (3B)$$

In S2, next, a high frequency imaging signal $dY(j,i)$ is generated by the following equation (4A) on the basis of the imaging luminance signal $Y(j,i)$ using a two-dimensional band pass filter for extracting a high frequency component of a spatial frequency. The two-dimensional band pass filter $\{F_{BPF}(j_{BPF}, i_{BPF}) | -n_{BPF} \le j_{BPF} \le n_{PF}, -m_{BPF} \le i_{BPF} \le m_{BPF}\}$ is used. A $k^{th}$ viewpoint high frequency signal $dY_k(j,i)$ is generated by the following equation (4B) on the basis of the $k^{th}$ viewpoint luminance signal $Y_k(j,i)$ ($k=1$ to $N_{LF}$).

$$dY(j, i) = \left| \sum_{j_{BPF}=-n_{BPF}}^{n_{BPF}} \sum_{i_{BPF}=-m_{BPF}}^{m_{BPF}} F_{BPF}(j_{BPF}, i_{BPF}) \times Y(j + j_{BPF}, i + i_{BPF}) \right|, \quad (4A)$$

$$dY_k(j, i) = \left| \sum_{j_{BPF}=-n_{BPF}}^{n_{BPF}} \sum_{i_{BPF}=-m_{BPF}}^{m_{BPF}} F_{BPF}(j_{BPF}, i_{BPF}) \times Y_k(j + j_{BPF}, i + i_{BPF}) \right|. \quad (4B)$$

The present embodiment is an example of a division of $N_{LF}=2$ using $Nx=2$ and $Ny=1$. A two-dimensional band pass filter $F_{BPF}(j_{BPF}, i_{BPF})$ is constituted by a direct product of a one-dimensional filter $Fx(i_{BPF})$ in an x direction (a pupil division direction) and a one-dimensional filter $Fy(j_{BPF})$ in a y direction (a direction orthogonal to the pupil division direction). That is, $F_{BPF}(j_{BPF}, i_{BPF}) = Fy(j_{BPF}) \times Fx(i_{BPF})$. A one-dimensional band pass filter whose coefficient is, for example, $0.5 \times [1,2,0,-2,-1] + 1.5 \times [1,0,-2,0,1]$ or the like is used as the one-dimensional filter $Fx(i_{BPF})$ in the pupil division direction to extract a high frequency component of a spatial frequency in the x direction. Here, a mixed filter obtained by combining a first-order differential-type filter $[1,2,0,-2,-1]$ and a second-order differential-type filter $[1,0,-2,0,1]$ is used. In general, if differential-type filter processing is performed, there is a zero point at a portion changing from the positive sign to the negative sign in a signal after the filter processing. For this reason, a node may occur in a region including the high frequency component of a spatial frequency in some cases by combining with an absolute value calculation. A position at which a node occurs varies with an order of differentiation of a differential-type filter. Therefore, occurrence of a node is suppressed by using a mixed filter obtained by combining the first-order differential-type filter and the second-order differential-type filter (generally, differential-type filters of different orders). The first-order differential-type filter such as $[1,2,0,-2,-1]$, the second-order differential-type filter such as $[1,0,-2,0,1]$, a high-order differential-type filter, or a more general one-dimensional band pass filter may also be used when necessary.

A high frequency cut (low pass) filter such as $[1,1,11,11]$ or $[1,4,6,4,1]$ can be used as the one-dimensional filter $Fy(j_{BPF})$ in the y direction (the direction orthogonal to the pupil division direction) to suppress high frequency noise in the y direction. When necessary, band pass filter processing of extracting the high frequency component of a spatial frequency may be performed in any of the x direction and the y direction. In the present embodiment, the two-dimensional band pass filter constituted by a direct product of two one-dimensional filters is shown, but the present embodiment is not limited thereto, and a general two-dimensional band pass filter can be used.

In S2, next, a normalized high frequency imaging signal $dZ(j,i)$ is generated by the following equation (5A). In Equation (5A), $Y_0 > 0$, and the high frequency imaging signal $dY(j,i)$ is normalized by the imaging luminance signal $Y(j,i)$. In addition, a $k^{th}$ normalized viewpoint high frequency signal $dZ_k(j,i)$ is generated by the following equation (5B). A $k^{th}$ viewpoint high frequency signal $dY_k(j,i)$ ($k=1$ to $N_{LF}$) is normalized by the $k^{th}$ viewpoint luminance signal $Y_k(j,i)$. A maximum value determination that a denominator $Y_0$ is greater than 0 is processing for preventing division by zero. When necessary, high frequency cut (low pass) filter processing may be performed on the imaging luminance signal $Y(j,i)$ and the $k^{th}$ viewpoint luminance signal $Y_k(j,i)$ before the normalization in Equation (5A) and Equation (5B) to suppress a high frequency noise.

$$dZ(j,i)=dY(j,i)/\max(Y(j,i),Y_0), \tag{5A}$$

$$dZ_k(j,i)=dY_k(j,i)/\max(Y_k(j,i),Y_0). \tag{5B}$$

In S2, next, an imaging contrast distribution $C(j,i)$ is generated by the following equation (6A) using a low luminance threshold value $Y_{min}$, a contrast maximum threshold value $C_{max}$, and an exponent y. In the same manner, a $k^{th}$ viewpoint contrast distribution $C_k(j,i)$ ($k=1$ to $N_{LF}$) is generated by the following equation (6B).

$$C(j,i) = \begin{cases} 0 & (Y(j,i) < Y_{min}), \\ (dZ(j,i)/C_{max})^\gamma & (dZ(j,i) \le C_{max}), \\ 1 & (dZ(j,i) > C_{max}). \end{cases} \tag{6a}$$

$$C_k(j,i) = \begin{cases} 0 & (Y(j,i) < Y_{min}), \\ (dZ_k(j,i)/C_{max})^\gamma & (dZ_k(j,i) \le C_{max}), \\ 1 & (dZ_k(j,i) > C_{max}). \end{cases} \tag{6b}$$

In the first row of Equation (6A), when the imaging luminance signal $Y(j,i)$ is smaller than the low luminance threshold value $Y_{min}$, a value of the imaging contrast distribution $C(j,i)$ is set to 0. In the third row of Equation (6A), if the normalized high frequency imaging signal $dZ(j,i)$ is greater than the contrast maximum threshold value $C_{max}$, a value of the imaging contrast distribution $C(j,i)$ is set to 1. Otherwise, in the second row of Equation (6A), the imaging contrast distribution $C(j,i)$ is set to a value obtained by normalizing the normalized high frequency imaging signal $dZ(j,i)$ using the contrast maximum threshold value $C_{max}$ and raising a result to a $\gamma^{th}$ power.

As described above, the imaging contrast distribution $C(j,i)$ takes a value within a range of [0,1] (0 to 1). A value of $C(j,i)$ close to 0 indicates that contrast is low, and a value of $C(j,i)$ close to 1 indicates that contrast is high, $dZ(j,i)/C_{max}$ is raised to the $\gamma^{th}$ power to adjust a tone curve from 0 to 1 of the imaging contrast distribution $C(j,i)$. A value of the exponent y is desirably 1.5 or more and 2.5 or less such that a change on a low contrast side is slow and a change on a high contrast side is steep.

The imaging contrast distribution may also be calculated by a synthesis function $F(C(j,i))$ using a function F from a domain [0,1] to a range [0,1]:[0,1]→[0,1] when necessary.

The $k^{th}$ viewpoint contrast distribution $C_k(j,i)$ is calculated in the same manner as described above.

Figure 13:
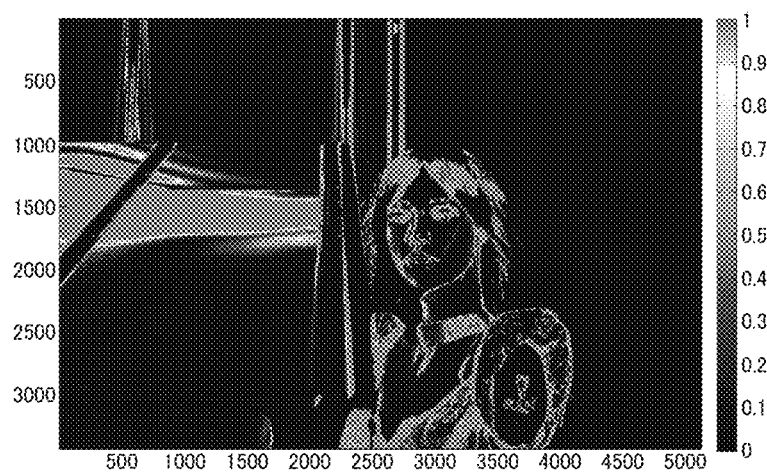
FIG. 13 is a diagram which shows an example of imaging contrast distribution of the captured image in the first embodiment.
Figure 14:
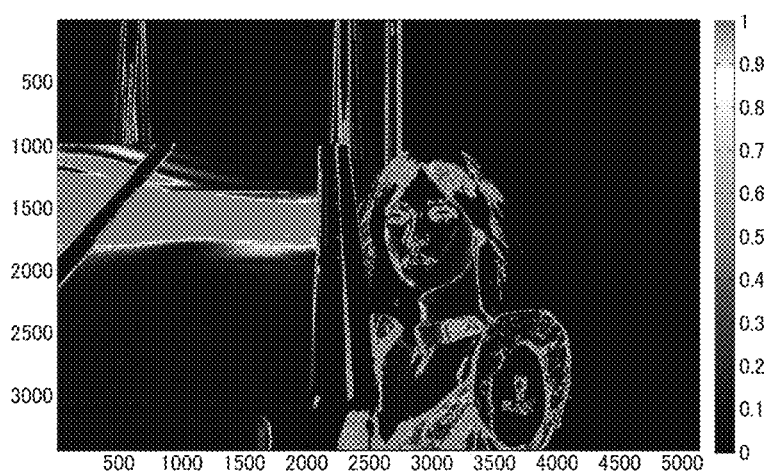
FIG. 14 is a diagram which shows an example of contrast distribution of a first viewpoint image in the first embodiment.
Figure 15:
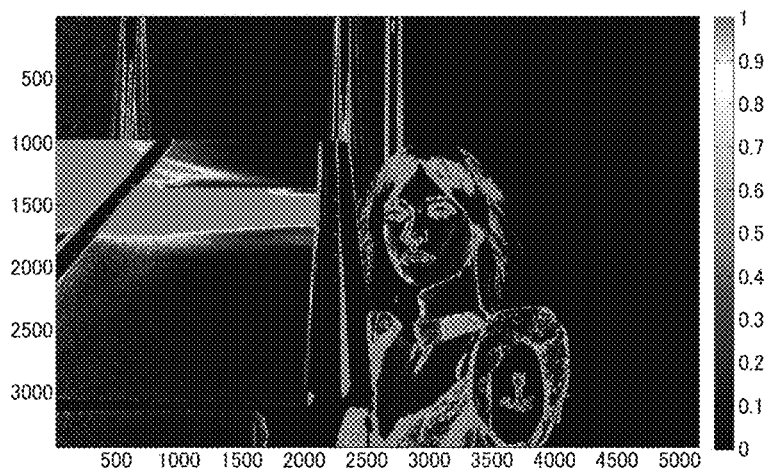
FIG. 15 is a diagram which shows an example of contrast distribution of a second viewpoint image in the first embodiment.

FIG. 13 shows a distribution example of the imaging contrast distribution $C(j,i)$ of the present embodiment. FIG. 14 shows a distribution example of a first viewpoint contrast distribution $C_1(j,i)$, and FIG. 15 shows a distribution example of a second viewpoint contrast distribution $C_2(j,i)$. In the distribution examples shown in FIGS. 13 to 15, an indicator indicating a high or low degree of contrast is represented in a gray scale display in a range of [0,1] on the right side. A white portion near 1 indicates a region in which there are many high frequency components of a spatial frequency in the x direction and contrast is high, and a black portion near 0 indicates a region in which there are few high frequency components of a spatial frequency in the x direction and contrast is low.

Figure 16A:
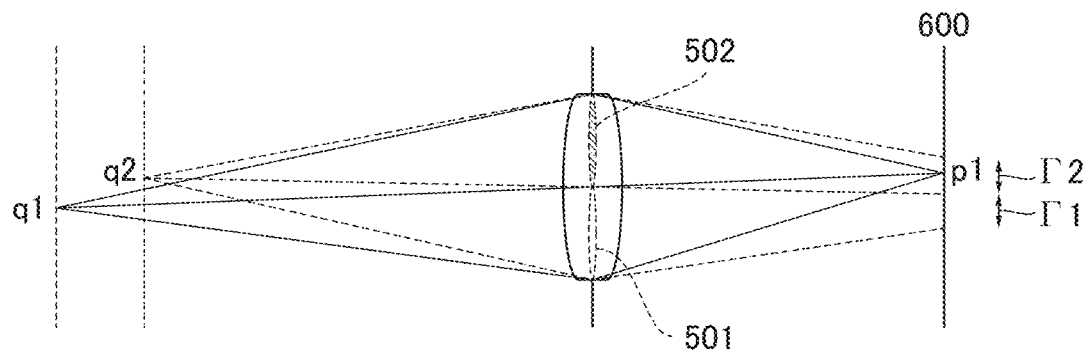
FIGS. 16A to 16C are schematic relationship diagrams of parallax and perspective conflict between the viewpoint images in the first embodiment.
Figure 16B:
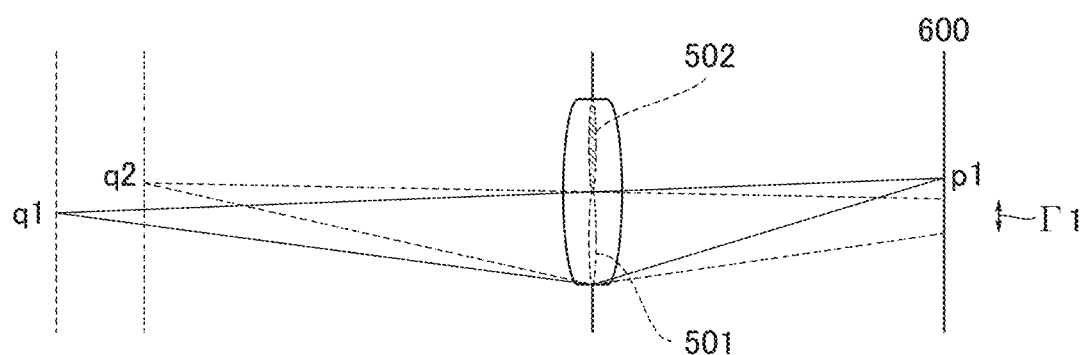
Figure 16C:
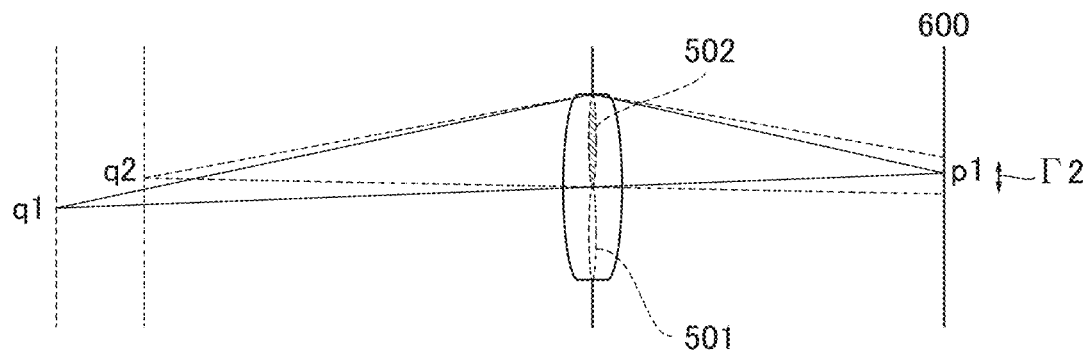

A relationship of parallax between a plurality of viewpoint images (the first viewpoint image and the second viewpoint image) and perspective conflict or occlusion in the present embodiment will be described using FIGS. 16A to 16C. In FIGS. 16A to 16C, the imaging element (not shown) of the present embodiment is disposed on the imaging surface 600, and an exit pupil of the image forming optical system is divided into two of the first pupil partial region 501 and the second pupil partial region 502 in the same manner as in FIGS. 4, 7, and 8.

FIG. 16A shows an example in which a blurred image Γ1+Γ2 of a subject q2 on the front overlaps an in-focus image p1 of a subject q1 to be photographed, and a perspective conflict occurs in the photographed image. In this example, a state of a division into a light flux passing through the first pupil partial region 501 of the image forming optical system and a light flux passing through the pupil partial region 502 is shown in FIGS. 16B and 16C.

In FIG. 16B, a light flux from the subject q1 passes through the first pupil partial region 501, and is image-formed into an image p1 in an in-focus state. A light flux from the subject q2 on the front passes through the first pupil partial region 501, spreads to a blurred image Γ1 in a defocus state, and is received by the sub-pixel 201 of each pixel of the imaging element. A first viewpoint image is generated on the basis of a light-receiving signal of the sub-pixel 201. In the first viewpoint image, the image p1 of the subject q1 and the blurred image Γ1 of the subject q2 on the front are photographed not to overlap at different positions. In the first viewpoint image, no perspective conflict or occlusion occurs between a plurality of subjects (the subject q1 and the subject q2).

On the other hand, in FIG. 16C, the light flux from the subject q1 passes through the second pupil partial region 502, and is image-formed into the image p1 in the in-focus state. The light flux from the subject q2 on the front passes through the second pupil partial region 502, spreads to a blurred image Γ2 in the defocus state, and is received by the sub-pixel 202 of each pixel of the imaging element. A second viewpoint image is generated on the basis of a light-receiving signal of the sub-pixel 202. In the second viewpoint image, the image p1 of the subject q1 and the blurred image Γ2 of the subject q2 on the front are photographed to overlap. In the second viewpoint image, a perspective conflict or occlusion occurs between the plurality of subjects (the subject q1 and the subject q2).

In the example of FIG. 16, in the vicinity of a region in which a perspective conflict of occlusion occurs in a photographed image, states in which a perspective conflict or occlusion occurs in the first viewpoint image and the second viewpoint image constituting the photographed image are different. This indicates that a difference between the first viewpoint image and the second viewpoint image is highly likely to increase. Therefore, it is possible to estimate a region with a high possibility of perspective conflict or occlusion occurring by detecting a region in which the difference between a plurality of viewpoint images is large.

Figure 17:
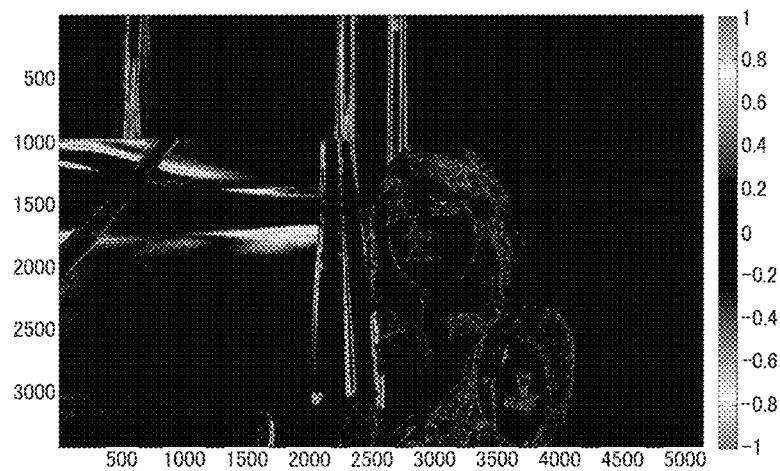
FIG. 17 is a diagram which shows an example of a contrast difference amount distribution between the viewpoint images in the first embodiment.

FIG. 17 shows a difference amount distribution $C_1(j,i)-C_2(j,i)$ between the first viewpoint contrast distribution $C_1(j,i)$ and the second viewpoint contrast distribution $C_2(j,i)$ of the present embodiment. In the distribution example shown in FIG. 17, an indicator indicating a large or small degree of a difference in contrast between the first viewpoint image and the second viewpoint image (a difference amount between the first viewpoint contrast distribution and the second viewpoint contrast distribution) is represented in a gray scale display in a range of [−1,1] on the right side. A black portion near 0 indicates a region in which the difference in contrast between the first viewpoint image and the second viewpoint image is small. On the other hand, a white portion near ±1 indicates a region in which the difference in contrast between the first viewpoint image and the second viewpoint image is large.

In FIG. 17, a region in which a perspective conflict or occlusion occurs is detected at a body of a subject (a doll) and a checked flat plate in the lower central part, as a white region in which the difference in contrast between the first viewpoint image and the second viewpoint image is large. In addition, a region with a large image shift amount while maintaining a high contrast such as a subject edge portion in the defocus state is detected, in addition to the region in which a perspective conflict or occlusion occurs. This region is a region in which a high frequency band component of a spatial frequency greatly changes in the first viewpoint image and the second viewpoint image. In these detection regions, subject images with significantly different spatial frequency components are photographed in each of the first viewpoint image and the second viewpoint image. For this reason, in a captured image obtained by synthesizing the first viewpoint image and the second viewpoint image, the detection region is a mixed region in which a plurality of subject images with significantly different spatial frequency components are mixed.

If image processing such as sharpening or smoothing is strongly performed on the mixed region of a plurality of subject images with different spatial frequency components, image quality may decrease. Therefore, the mixed region of a plurality of subject images with different spatial frequency components is detected using an absolute value $|C_1(j,i)-C_2(j,i)|$ of the difference amount distribution between the first viewpoint contrast distribution and the second viewpoint contrast distribution in the present embodiment. Image processing such as sharpening or smoothing can be performed while maintaining good image quality by suppressing and performing image processing such as sharpening or smoothing in the detected mixed region.

In the present embodiment, in S2, the mixed region of a plurality of subject images with different spatial frequency components is detected. For this reason, a contrast difference amount distribution $C_{DIFF}(j,i)$ is generated by Equation (7A) on the basis of the first viewpoint contrast distribution $C_1(j,i)$ and the second viewpoint contrast distribution $C_2(j,i)$. Next, the contrast difference amount distribution $C_{DIFF}(j,i)$ is multiplied to the imaging contrast distribution $C(j,i)$ as in Equation (7B). As a result, a contrast distribution $M_{CON}(j,i)$ whose value in the mixed region of a plurality of subject images with different spatial frequency components is suppressed to near 0 is generated.

$$C_{DIFF}(j,i)=1-|C_1(j,i)-C_2(j,i)|, \quad (7A)$$

$$M_{CON}(j,i)=C(j,i) \times C_{DIFF}(j,i). \quad (7B)$$

The contrast difference amount distribution $C_{DIFF}(j,i)$ is a distribution of a range of [0,1]. In other words, this is a distribution which has a value approaching 0 in a region with a large contrast difference between viewpoint images and many mixtures of subject images with different spatial frequency components, and has a value approaching 1 in a region with a small contrast difference between viewpoint images and few mixtures of subject images with different spatial frequency components. The contrast distribution $M_{CON}(j,i)$ is a distribution obtained by multiplying the imaging contrast distribution $C(j,i)$ by the contrast difference amount distribution $C_{DIFF}(j,i)$, and thus is a distribution whose value in the mixed region of a plurality of subject images with different spatial frequency components is suppressed to near 0.

Figure 18:
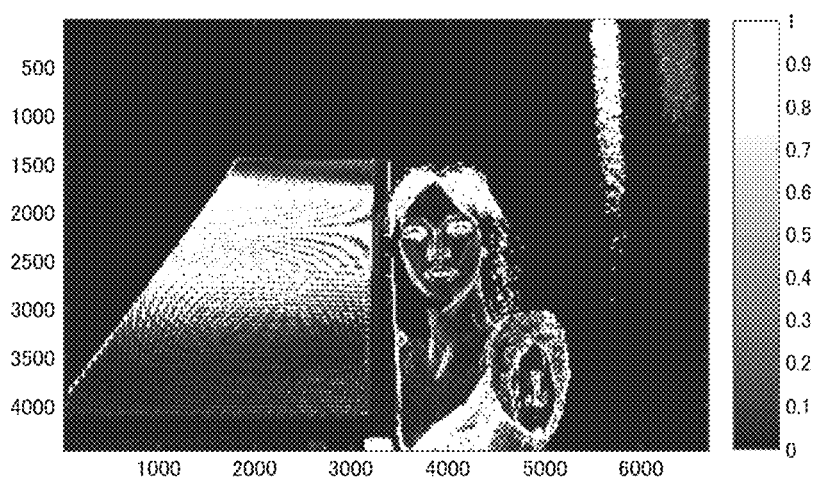
FIG. 18 is a diagram which shows an example of a contrast distribution of the first embodiment.

FIG. 18 shows a distribution example of contrast distribution $M_{CON}(j,i)$ of the present embodiment. In the distribution example shown in FIG. 18, an indicator indicating a high or low degree of contrast is represented in a gray scale display of a range of [0,1] on the right side. A white portion near 1 indicates a region in which there are many high frequency components of a spatial frequency in the x direction and contrast is high, and a black portion near 0 indicates a region in which there are few high frequency components of a spatial frequency in the x direction and contrast is low. In a region in which an absolute value $|C_1(j,i)-C_2(j,i)|$ is large with respect to the imaging contrast distribution $C(j,i)$ shown in FIG. 13, a contrast value is suppressed.

In the present embodiment, as the contrast difference amount distribution $C_{DIFF}(j,i)$, a linear function which monotonically decreases with respect to an absolute value $|C_1(j,i)-C_2(j,i)|$ of the difference amount distribution between the first viewpoint contrast distribution and the second viewpoint contrast distribution is used. More general functions may be used when necessary.

In the present embodiment described above, processing of generating a contrast distribution $M_{CON}(j,i)$ is executed in accordance with a difference in contrast of respective viewpoint images on the basis of a captured image and a plurality of viewpoint images. A contrast distribution value of the present embodiment is larger in a region with a smaller difference in contrast than in a region with a larger difference in contrast of respective viewpoint images. In addition, the contrast distribution value of the present embodiment is larger in a region with many spatial frequency components of a captured image in a predetermined spatial frequency band than in a region with few spatial frequency components. In addition, the contrast distribution value of the present embodiment is larger in a region with high luminance of a captured image than in a region with low luminance.

In second and subsequent processing, it is possible to omit generation of the contrast distribution $M_{CON}(j,i)$ and to shorten processing time. For this reason, processing of recording data of the generated contrast distribution $M_{CON}(j,i)$ in a recording medium and the like such as the flash memory 133 in association with recorded image data is performed.

In S3 of FIG. 9, an image shift amount distribution is generated on the basis of a correlation (a signal matching degree) between the first viewpoint image and the second viewpoint image from the first viewpoint image and the second viewpoint image at each position (j,i) at which a value of the contrast distribution $M_{CON}(j,i)$ is equal to or more than a predetermined value. The present invention is not limited to the present embodiment, and an image shift amount distribution may also be generated on the basis of each viewpoint image regardless of the value of the contrast distribution $M_{CON}(j,i)$.

In addition, the image shift amount distribution representing a parallax map is exemplified as generated distribution information, but the generated distribution information is not limited to this distribution information in an application of the present invention. The generated distribution information may also be a defocus amount distribution representing a defocus amount distribution, or a subject distance distribution representing a distance between an imaging apparatus and a subject.

In S3, one-dimensional band pass filter processing is performed on a first viewpoint luminance signal $Y_1$ generated by Equation (3B) in a pupil division direction (a column direction) from a first viewpoint image $I_1$ which is an RGB signal of the Bayer array to generate a first focus detection signal dYA. In addition, one-dimensional band pass filter processing is performed on a second viewpoint luminance signal $Y_2$ generated by Equation (3B) in the pupil division direction (the column direction) from a second viewpoint image $I_2$ to generate a second focus detection signal dYB. As a one-dimensional band pass filter, for example, a first-order differential-type filter [1,5,8,8,8,8,5,1,−1,−5,−8,−8,−8,−8, −5,−1] and the like can be used. When necessary, a passband of the one-dimensional band pass filter may also be adjusted.

In S3, next, an image shift amount distribution $M_{DIS}(j,i)$ is generated at each position (j,i) at which the value of the contrast distribution $M_{CON}(j,i)$ is equal to or greater than a predetermined value (for example, 0.2). The first focus detection signal dYA and the second focus detection signal dYB are relatively shifted in the pupil division direction (the column direction) and processing of calculating a correlation amount representing a signal matching degree is performed to generate an image shift amount distribution $M_{DIFF}(j,i)$ on the basis of the correlation amount. On the other hand, each position (j,i) at which the value of the contrast distribution $M_{CON}(j,i)$ is less than a predetermined value (for example, 0.2) is excluded from calculation of the image shift amount. A detection accuracy of the image shift amount can be increased and processing can be sped up by limiting a detection of the image shift amount to a region with high contrast in which no perspective conflict or occlusion occurs.

Centering on a focused position (j,i), a first focus detection signal in a $j^{th}$ ($-n_2 \leq j_2 \leq n_2$) row and an $i_2^{th}$ ($-m_2 \leq i_2 \leq m_2$) column is set as $dYA(j_1+j_2, i_1+i_2)$, and a second focus detection signal is set as $dYB(j+j_2, i_1+i_2)$. A shift amount is set as s ($-n_s \leq s \leq n_s$). A correlation amount $COR_{EVEN}(j,i,s)$ at each position (j,i) is calculated by Equation (8A), and a correlation amount $COR_{ODD}(j,i,s)$ is calculated by Equation (8B).

$$COR_{even}(j, i, s) = \sum_{j_2=-n_2}^{n_2} \sum_{i_2=-m_2}^{m_2} |dYA(j+j_2, i+i_2+s) - dYB(j+j_2, i+i_2-s)| \quad (8a)$$

$$COR_{odd}(j, i, s) = \sum_{j_2=-n_2}^{n_2} \sum_{i_2=-m_2}^{m_2} |dYA(j+j_2, i+i_2+s) - dYB(j+j_2, i+i_2-1-s)| \quad (8b)$$

The correlation amount $COR_{ODD}(j,i,s)$ is a correlation amount obtained by shifting shift amounts of the first detection signal dYA and the second focus detection signal dYB by half a phase −1 with respect to the correlation amount $COR_{EVEN}(j,i,s)$. An operation of calculating a shift amount of a real value whose correlation amount is a minimum value and calculating an average value by performing a sub-pixel calculation on each of the correlation amount $COR_{EVEN}(j,i,s)$ and the correlation amount $COR_{ODD}(j,i,s)$ is performed, and the image shift amount distribution $M_{DIFF}(j,i)$ is generated.

$M_{DIS}(j,i)=0$ is set for a region excluded from calculation of an image shift amount because the value of the contrast distribution $M_{CON}(j,i)$ is less than a predetermined value (for example, 0.2). A value other than 0 may also be set when necessary.

Figure 10C:
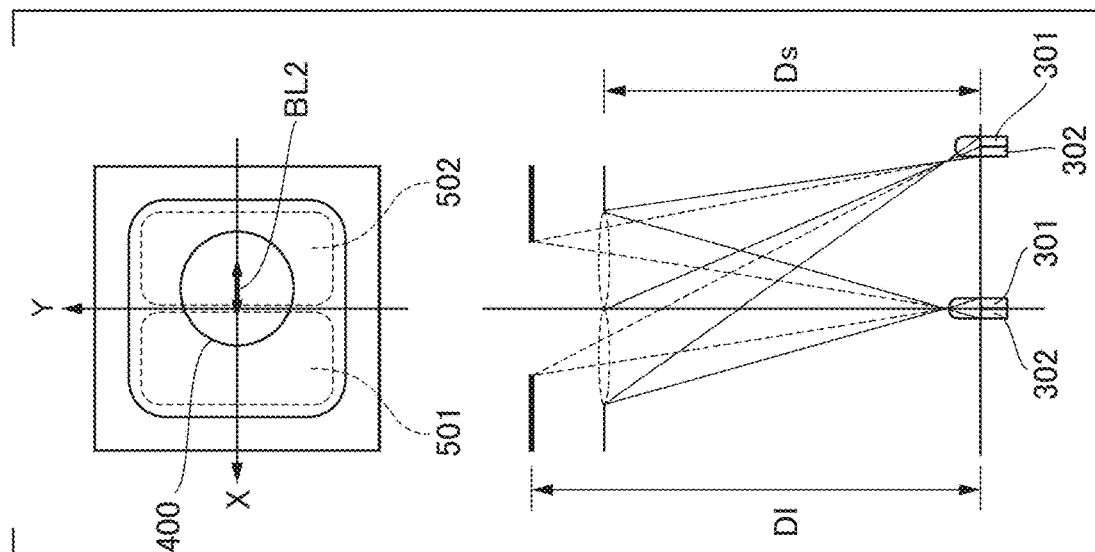
FIGS. 10A to 10C are schematic diagrams which describe a pupil shift in a first viewpoint image and a second viewpoint image.
Figure 10B:
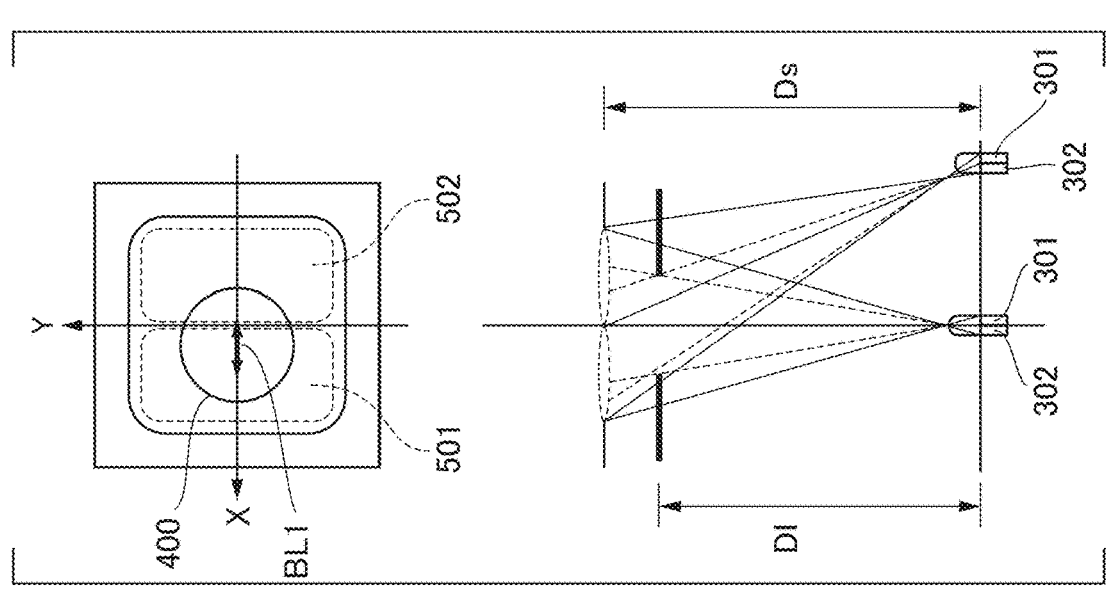
Figure 10A:
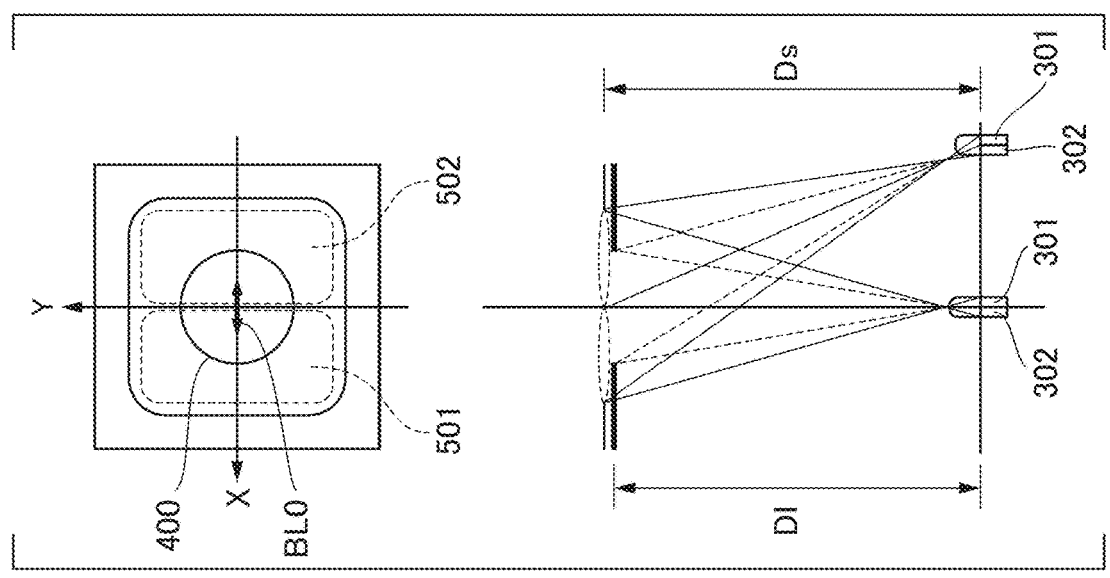

Next, to explain a relationship between an image shift amount and an F value, first, a conversion coefficient for converting an image shift amount into a defocus amount will be described. A base line length is an interval between centers of gravity of the first pupil partial region 501 and the second pupil partial region 502 on a pupil surface with a predetermined pupil distance. FIGS. 10A to 10C show a relationship among the base line length BL 0, BL 1, BL 2, the first pupil partial region 501 of the first focus detection pixel 201, the second pupil partial region 502 of the second focus detection pixel 202, and the exit pupil 400 of the imaging optical system in the peripheral image height of the imaging element.

FIG. 10A shows a case in which the exit pupil distance D1 of the imaging optical system is equal to the set pupil distance Ds of the imaging element. In this case, the exit pupil 400 of the imaging optical system is substantially evenly pupil-divided by the first pupil partial region 501 and the second pupil partial region 502. A base line length which is an interval between a center of gravity of the first pupil partial region 501 and a center of gravity of the second pupil partial region 502 in the exit pupil 400 is indicated by BL0. At this time, a conversion coefficient K which is required for conversion from an image shift amount to a detected defocus amount is obtained by K=Ds/BL0.

In contrast, FIG. 10B shows a case in which an exit pupil distance D1 of the imaging optical system is shorter than the set pupil distance Ds of the imaging element. In this case, there is a pupil shift between an exit pupil of the imaging optical system and an entrance pupil of the imaging element in the peripheral image height of the imaging element, and the exit pupil 400 of the imaging optical system is unevenly pupil-divided. Therefore, the base line length becomes BL 1 which is biased to one side, and accordingly a conversion coefficient (denoted as K1) changes to K1=Ds/BL1. FIG. 10C shows a case in which the exit pupil distance D1 of the imaging optical system is longer than the set pupil distance Ds of the imaging element. In this case, there is a pupil shift between an exit pupil of the imaging optical system and an entrance pupil of the imaging element in the peripheral image height of the imaging element, and the exit pupil 400 of the imaging optical system is unevenly pupil-divided. Therefore, the base line length becomes BL2 which is biased to the side opposite the side in FIG. 10B, and accordingly a conversion coefficient (denoted as K2) changes to K2=Ds/BL2.

In this manner, it is known that a conversion coefficient from an image shift amount into a detected defocus amount varies with a diaphragm value and an exit pupil distance of the imaging optical system, a pupil intensity distribution (optical properties) of the imaging element, and an image height.

Next, processing of changing a detection range, which is the shift amount range described above, in accordance with a photographing condition will be described. A minimum value and a maximum value of a defocus amount to be detected are denoted as defmin and defmax, respectively. If the conversion coefficient from image shift amount into a defocus amount is expressed as K, the minimum value DISmin and the maximum value DISmax of the detection range of the image shift amount distribution are respectively obtained by the following equations.

DISmin=defmin/K

DISmax=defmax/K

A maximum value and a minimum value of a distance range to be detected are expressed as DSTmax and DSTmin. respectively, a conversion coefficient is expressed as K, and a lateral magnification is expressed as m. A minimum value of a detection range of an image shift amount distribution is expressed as DISmin2, and a maximum value is expressed as DISmax2. These are obtained from the following equation. "^" represents exponentiation.

DISmin2=(DSTmin/m^2)/K

DISmax2=(DSTmax/m^2)/K

According to the above equation, the detection range of an image shift amount distribution is determined. For example, the detection range can be changed in accordance with a size of the face or the body of a person, and the detection range can be changed in accordance with a subject distance depending on a photographing condition. Since an image shift amount distribution can be calculated appropriately in accordance with a subject, appropriate image processing can be performed on the subject.

Next, an image shift amount and a subject distance will be described. When an image shift amount s is converted into a defocus amount (s×K) using the conversion coefficient K, a relationship between the defocus amount and a subject distance L is as in the following equation.

L=s×K×m² m in the above equation is a lateral magnification, and m² is a longitudinal magnification. That is, if the same image shift amount is converted into an actual distance, a subject distance L is proportional to the longitudinal magnification m² and the conversion coefficient K. When the image processing described above is performed, if the same range for calculating the image shift amount is used, an actual distance varies depending on the lateral magnification m, and thus a range for performing image processing varies.

As described above, it is possible to perform the image processing described above within an appropriate range in accordance with a subject by changing the detection range of the image shift amount at the time of generating an image shift amount distribution in accordance with an F value, an exit pupil distance of the image forming optical system, an image height, a subject distance, and a lateral magnification. Processing of changing the detection range of the image shift amount distribution in accordance with a photographing condition will be described below with reference to a sub-flowchart of the generation of an image shift amount distribution in S3.

Figure 19:
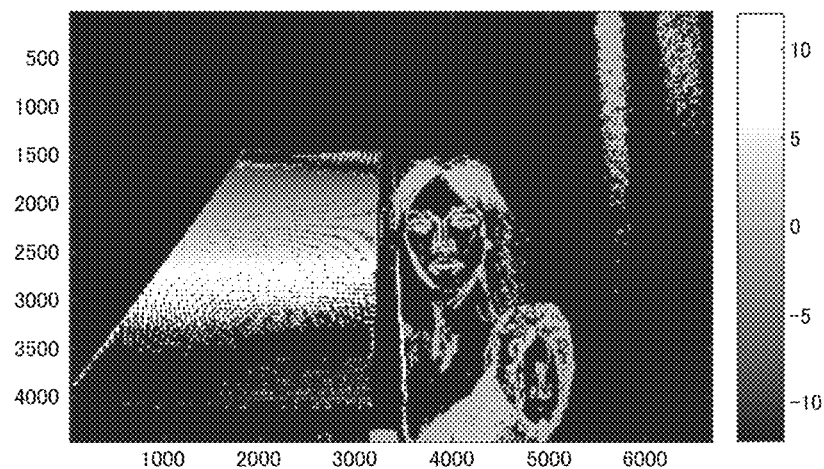
FIG. 19 is a diagram which shows an example of an image shift amount distribution of the first embodiment.

FIG. 19 shows a distribution example of the image shift amount distribution $M_{DIS}(j,i)$ according to this embodiment.

A gray scale display in a predetermined range is shown on the right side. In the distribution example of FIG. 19, regarding a region in which an image shift amount is calculated when the value of the contrast distribution $M_{CON}(j,i)$ is a predetermined value 0.2 or more, an image shift amount between the first viewpoint image and the second viewpoint image is expressed in a 1 pixel (1 pixel) unit in the gray scale display. A part on a black side with a minus (−) sign indicates a region in the front-pin state, the vicinity of 0 indicates a region in the vicinity of an in-focus position, and a part on a white side with a plus (+) sign indicates a region in the post-pin state. In addition, a region which is excluded from the calculation for an image shift amount when the value of the contrast distribution $M_{CON}(j,i)$ is less than the predetermined value 0.2, and is set as $M_{DIS}(j,i)=0$ is displayed in black in the distribution example of FIG. 19.

As described above, in the present embodiment, the image shift amount distribution $M_{DIS}(j,i)$ is generated on the basis of a plurality of viewpoint images, but it is possible to omit the generation of the image shift amount distribution $M_{DIS}(j,i)$ and to shorten processing time in second and subsequent processing. For this reason, processing of recording data of the generated image shift amount distribution $M_{DIS}(j,i)$ in association with recorded image data in a recording medium such as the flash memory 133, or the like is performed.

When necessary, it is possible to convert the image shift amount distribution into a defocus amount distribution. The image shift amount distribution $M_{DIS}(j,i)$ may be multiplied by a conversion coefficient in accordance with a position (j,i), a diaphragm value of an imaging lens (the image forming optical system), an exit pupil distance, and the like.

In S4 of FIG. 9, processing of generating an image shift difference amount distribution $M_{DIFF}(j,i)$ is performed on the basis of the image shift amount distribution $M_{DIS}(j,i)$ and a predetermined image shift amount. First, an image shift amount to be corrected by refocusing processing of the present embodiment is set as a predetermined image shift amount (denoted as p). For example, in an example of the image shift amount distribution $M_{DIS}$ in FIG. 19, an image shift amount in a region near the eyes is about 2.5. If the image shift amount in a region near the eyes of a subject (doll) is slightly corrected to substantially 0 by the refocusing processing, the predetermined image shift amount p is set to 2.5.

In S4, next, the image shift difference amount distribution $M_{DIFF}(j,i)$ is calculated by Equation (9). In Equation (9), $\sigma_p > 0$, and the image shift difference amount distribution $M_{DIFF}(j,i)$ is calculated on the basis of the image shift amount distribution $M_{DIS}(j,i)$, the predetermined image shift amount p, and the contrast distribution $M_{CON}(j,i)$.

$$M_{DIFF}(j,i) = \left(1 - \frac{|M_{DIS}(j,i) - p|}{\sigma_p}\right) \times M_{CON}(j,i) \quad (9)$$

The image shift difference amount distribution $M_{DIFF}(j,i)$ is a distribution obtained by multiplying a linear function monotonically decreasing with respect to an absolute value $|M_{DIS}(j,i) - p|$ of the difference between the image shift amount distribution $M_{DIS}(j,i)$ and the predetermined image shift amount p by the contrast distribution $M_{CON}(j,i)$. The image shift difference amount distribution $M_{DIFF}=(j,i)$ is positive at $|M_{DIS}(j,i) - p| < \sigma_p$, is 0 at $|M_{DIS}(j,i) - p| = \sigma_p$, and is negative at $|M_{DIS}(j,i) - p| > \sigma_p$. A region which is excluded from the calculation of an image shift amount because the value of the contrast distribution $M_{CON}(j,i)$ is less than a predetermined value (for example, 0.2) is set as $M_{DIFF}F(j,i)=(1-|P|/\sigma_p)\times M_{CON}(j,i)$. When necessary, another value may be set for the region.

Figure 20:
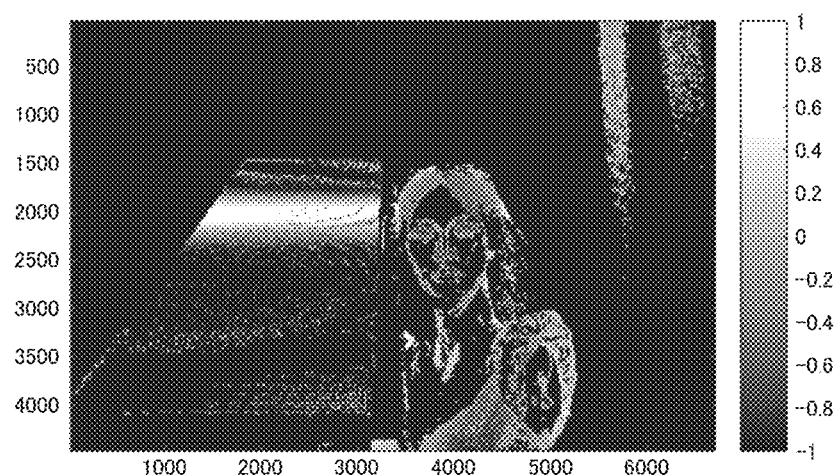
FIG. 20 is a diagram which shows an example of an image shift difference amount distribution in the first embodiment.

FIG. 20 shows a distribution example of the image shift difference amount distribution $M_{DIFF}(j,i)$ of the present embodiment. A region in which the image shift amount is calculated at the value of the contrast distribution $M_{CON}$ being equal to or greater than the predetermined value 0.2 indicates an image shift difference amount in the gray scale display in a range of [−1,1] on the right side. A part on a white side of a plus (+) sign indicates a region in which the absolute value $|M_{DIS}(j,i)-p|$ of the difference between the image shift amount distribution $M_{DIFF}(j,i)$ and the predetermined image shift amount p is small, and contrast is high. A part on a black side of a minus (−) sign indicates a region in which the absolute value $|M_{DIS}(j,i)-p|$ of the difference between the image shift amount distribution $M_{DIS}(j,i)$ and the predetermined image shift amount p is large, and contrast is high. In addition, a region which is excluded from the calculation of an image shift amount at the value of the contrast distribution $M_{CON}(j,i)$ being less than the predetermined value 0.2 and is set as $M_{DIFF}(j,i)=(1-|p|/\sigma_p)\times M_{CON}(j,i)$ is displayed in black in the distribution example of FIG. 20.

In S5 of FIG. 9, first sharpening processing and first smoothing processing are performed on the plurality of viewpoint images. A first corrected viewpoint image and a second corrected viewpoint image are generated by performing first sharpening or first smoothing processing on a first viewpoint image and a second viewpoint image in accordance with an image shift difference amount distribution $M_{DIFF}(j,i)$.

In the present embodiment, processing of enlarging a difference between viewpoint images and sharpening (crosstalk correction and sharpening) parallax is performed on a plurality of viewpoint images in a region in which the image shift difference amount distribution is 0 or more ($M_{DIFF}(j,i) \geq 0$). This processing is hereinafter referred to as first sharpening processing. On the other hand, processing of reducing a difference between viewpoint images and smoothing (crosstalk correction and smoothing) parallax is performed in a region in which the image shift difference amount distribution is less than 0 ($M_{DIFF}F(j,i)<0$). This processing is hereinafter referred to as first smoothing processing. A plurality of corrected viewpoint images are generated by performing the first sharpening processing and the first smoothing processing.

First, in S5 of FIG. 9, a first intensity parameter $k_{ct}$ designating an intensity of the first sharpening processing or the first smoothing processing is set for the first viewpoint image and the second viewpoint image, $k_{ct}$ is set to be 0 or more. Next, a first intensity parameter distribution $K_{ct}(j,i)$ is set by Equation (10). The first intensity parameter distribution $K_{ct}(j,i)$ is proportional to the image shift difference amount distribution $M_{DIFF}(j,i)$ with $k_t$ being a proportional coefficient.

$$K_{ct}(j,i)=k_{ct}\times M_{DIFF}(j,i). \qquad (10)$$

In S5, next, processing of Equation (11A) and Equation (11B) is performed on a first viewpoint image $I_1(j,i)$ and a second viewpoint image $I_2(j,i)$ to generate a first corrected viewpoint image $MI_1(j,i)$ and a second corrected viewpoint image $MI_2(j,i)$.

$$\begin{pmatrix} MI_1(j,i) \\ MI_2(j,i) \end{pmatrix} = \begin{pmatrix} 1+K_{ct}(j,i) & -K_{ct}(j,i) \\ -K_{ct}(j,i) & 1+K_{ct}(j,i) \end{pmatrix} \begin{pmatrix} I_1(j,i) \\ I_2(j,i) \end{pmatrix}, \qquad (11A)$$

$(K_{ct}(j,i) \geq 0)$,

-continued $$\begin{pmatrix} MI_1(j,i) \\ MI_2(j,i) \end{pmatrix} = \begin{pmatrix} \frac{1-K_{ct}(j,i)}{1-2K_{ct}(j,i)} & \frac{-K_{ct}(j,i)}{1-2K_{ct}(j,i)} \\ \frac{-K_{ct}(j,i)}{1-2K_{ct}(j,i)} & \frac{1-K_{ct}(j,i)}{1-2K_{ct}(j,i)} \end{pmatrix} \begin{pmatrix} I_1(j,i) \\ I_2(j,i) \end{pmatrix}, \qquad (11B)$$

$(K_{ct}(j,i)<0)$.

Equation (11A) represents first sharpening processing performed in a region in which a first intensity parameter distribution (image shift difference amount distribution) is 0 or more ($K_{ct}(j,i)=k_{ct}\times M_{DIFF}(j,i)\geq 0$). Equation (11B) represents first smoothing processing performed in a region in which a first intensity parameter distribution (image shift difference amount distribution) is less than 0

$(K_{ct}(j,i)=k_{ct}\times M_{DIFF}(j,i)\leq 0)$.

Figure 21:
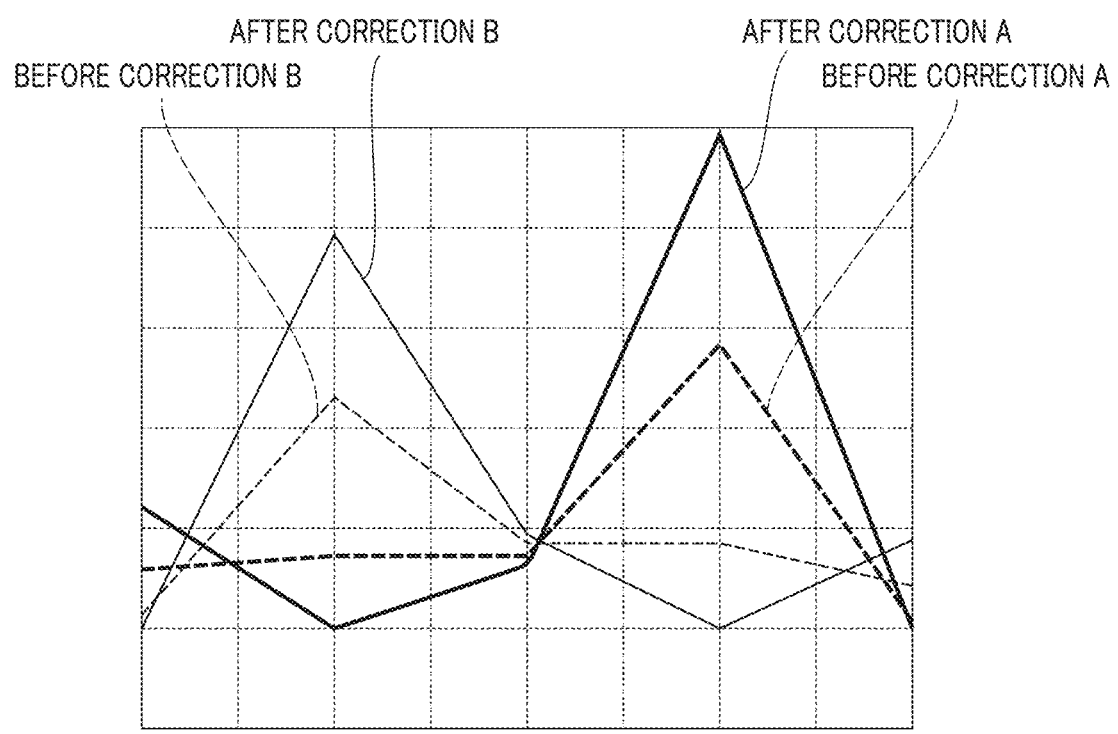
FIG. 21 is a diagram which shows an example of sharpening processing in the first embodiment.

FIG. 21 is a graph showing an example of the first sharpening processing for the first viewpoint image and the second viewpoint image. The horizontal axis represents a pixel position and the vertical axis represents a pixel value (signal level). In FIG. 21, examples of the first viewpoint image (before correction A) and the second viewpoint image (before correction B) before the first sharpening processing are shown by dashed line graphs. In addition, examples of a first corrected viewpoint image (after correction A) and a second corrected viewpoint image (after correction B) after the first sharpening processing by Equation (11A) are shown by solid line graphs. By the first sharpening processing, a part in which the difference between the viewpoint images is large before the processing is enlarged more, but a part in which the difference between the viewpoint images is small before the processing is not changed much. In this manner, it is known that parallax between the viewpoint images is sharpened. On the other hand, in the first smoothing processing by Equation (11B), the difference between the first viewpoint image and the second viewpoint image is reduced, and the parallax between the viewpoint images is smoothed.

As described above, image processing of sharpening and smoothing in accordance with distribution information corresponding to a contrast distribution and an image shift amount distribution is performed on a plurality of viewpoint images in the present embodiment. The image processing in accordance with the distribution information corresponding to a contrast distribution and an image shift amount distribution may be one of sharpening processing, smoothing processing, and processing in which both types of processing are combined when necessary.

The image processing such as sharpening or smoothing is more strongly performed on each viewpoint image in a region with a small difference in contrast of respective viewpoint images than in a region with a large difference in contrast of respective viewpoint images according to Equations (7A), (7B), (9), (10), (11A), and (11B). In addition, the image processing such as sharpening or smoothing is more strongly performed on each viewpoint image in a region with a large contrast distribution than in a region with a small contrast distribution.

The sharpening processing is performed on a region with a small difference between an image shift amount distribution and a predetermined shift amount (reference), and the smoothing processing is performed on a region with a large difference between an image shift amount distribution and a predetermined shift amount according to Equations (9), (10), (11A), and (11B). The sharpening processing is performed more strongly in the region with a small difference between an image shift amount distribution and a predetermined shift amount than in the region with a large difference according to Equations (9), (10), and (11A). Furthermore, smoothing processing is performed more strongly in the region with a large difference between an image shift amount distribution and a predetermined shift amount than in the region with a small difference according to Equations (9), (10), and (11B).

According to Equation (11A) and Equation (11B), processing of enlarging a difference between a plurality of viewpoint images and sharpening parallax or processing of reducing a difference between a plurality of viewpoint images and smoothing parallax is performed on each pixel of the plurality of viewpoint images to generate a plurality of corrected viewpoint images. The first sharpening processing of Equation (11A) and the first smoothing processing of Equation (11 B) are calculation processing between the first viewpoint image $I_1(j,i)$ which is an output signal of a first photoelectric conversion unit included in each pixel and the second viewpoint image $I_2(j,i)$ which is an output signal of a second photoelectric conversion unit.

In S6 of FIG. 9, a weighting factor for each corrected viewpoint image is set to slightly correct a depth of field in a predetermined region. In S6, first, a predetermined region R=[j1,j2] [i1,i2] in which a depth of field is re-corrected and a boundary width σ of the predetermined region are set. A table function T(j,i) in accordance with the predetermined region R and the boundary width σ of the predetermined region is calculated by Equation (12).

$$T(j, i) = 0.5 * \left[\tanh\frac{(j - j_1)}{\sigma} - \tanh\frac{(j - j_2)}{\sigma}\right] \times \\ 0.5 * \left[\tanh\frac{(i - i_1)}{\sigma} - \tanh\frac{(i - i_2)}{\sigma}\right]. \qquad (12)$$

A value of a table function T(j,i) is 1 inside the predetermined region R, is 0 outside the predetermined region R, and continuously changes substantially from 1 to 0 at the boundary width σ of the predetermined region R. The predetermined region may have a circular shape or any other arbitrary shape when necessary. Moreover, when necessary, a plurality of predetermined regions and boundary widths may also be set.

In S6, next, a weighting factor distribution of each corrected viewpoint image is calculated. As an actual coefficient w(−1≤w≤1), a first weighting factor distribution $W_1(j,i)$ of a first corrected viewpoint image $MI_1(j,i)$ is calculated by Equation (13A) and a second weighting factor distribution $W_2(j,i)$ of a second corrected viewpoint image $MI_2(j,i)$ is calculated by Equation (13B).

$$W_1(j,i)=1-wT(j,i), \qquad (13A)$$

$$W_2(j,i)=1+wT(j,i). \qquad (13B)$$

In the predetermined region, if an addition ratio of the first corrected viewpoint image $MI_1(j,i)$ is increased to correct a depth of field, setting is performed within a range of −1≤w≤0. If an addition ratio of the second corrected viewpoint image $MI_2(j,i)$ is increased to correct a depth of field, setting is performed within a range of 0≤w≤1. Setting is performed as w=0 and $W_1$≡$W_2$≡1, and thus a depth of field is not corrected in some cases.

In S7 of FIG. 9, processing of multiplying each corrected viewpoint image by a weighting factor, relatively shifting results in the pupil division direction (the x direction) for an addition (shift synthesis processing) is performed. In this processing, an intermediate image which is a synthesized image of a plurality of viewpoint images is generated.

Figure 22:
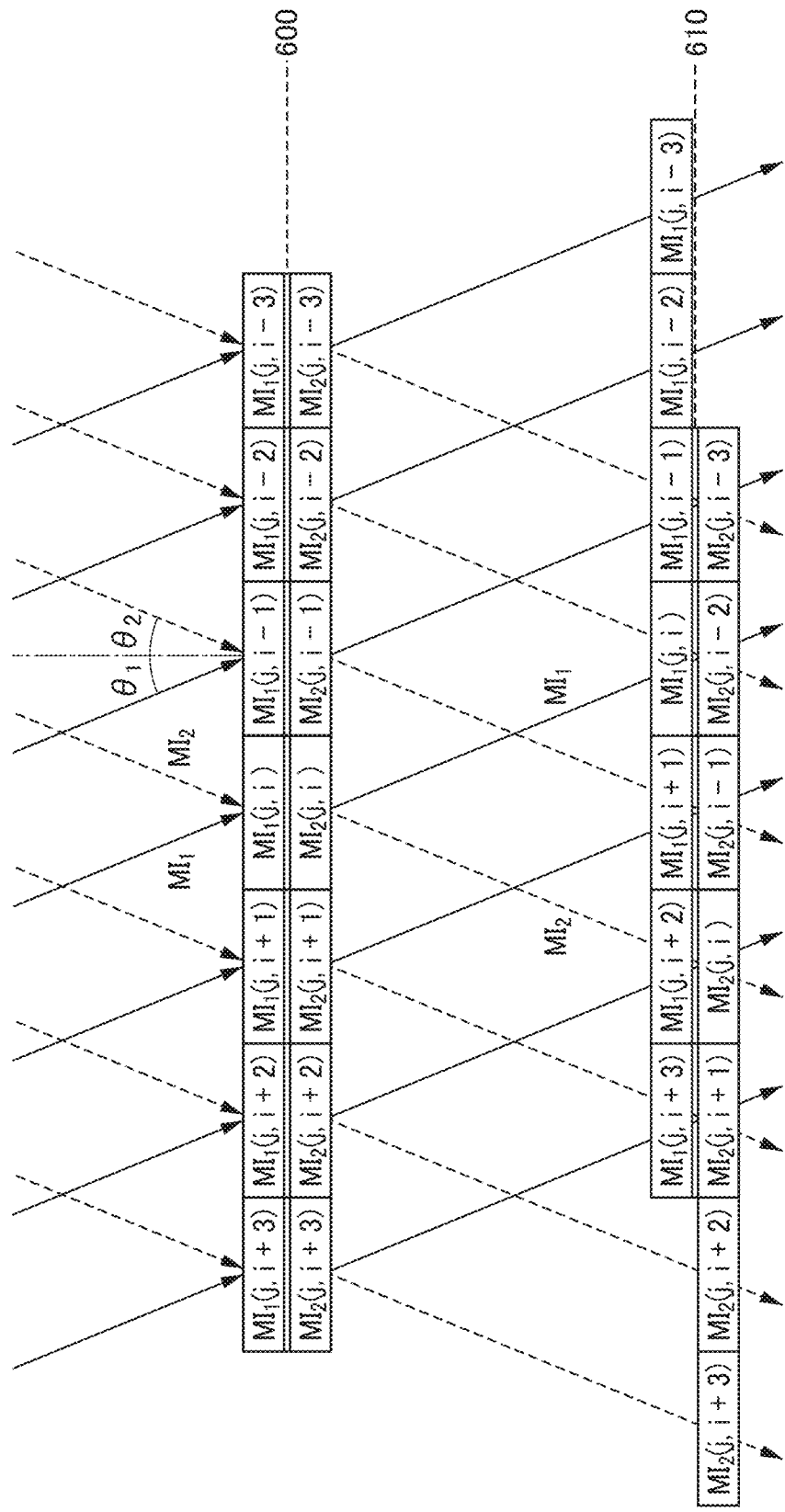
FIG. 22 is a schematic diagram which describes refocusing using shift synthesis processing in the first embodiment.

FIG. 22 is an explanatory diagram which shows an outline of refocusing using shift synthesis processing in the pupil division direction (the x direction) for the first corrected viewpoint image $MI_1(j,i)$ and the second corrected viewpoint image $MI_2(j,i)$. In FIG. 22, the lower side of an x axis set in a vertical direction of a paper surface is defined as a positive direction of the x axis, the front side of a y axis set in a direction perpendicular to the paper surface is defined as a positive direction of the y axis, and the left side of a z axis set in a horizontal direction of the paper surface is defined as a positive direction of the z axis. An imaging surface 600 of FIG. 22 corresponds to the imaging surface 600 shown in FIGS. 7, 8, 16A to 16C.

In FIG. 22, the first corrected viewpoint image $MI_1(j,i)$ and the second corrected viewpoint image $MI_2(j,i)$ are schematically shown. A signal of the first corrected viewpoint image $MI_1(j,i)$ is a light-receiving signal of a light flux incident on the first photoelectric conversion unit 301 at the position (j,i) at a principal ray angle $\theta_1$ corresponding to the first pupil partial region 501 in FIG. 7. A signal of the second corrected viewpoint image $MI_2(j,i)$ is a light-receiving signal of a light flux incident on the second photoelectric conversion unit 302 at the position (j,i) at a principal ray angle $\theta_2$ corresponding to the second pupil partial region 502 in FIG. 7.

The first corrected viewpoint image $MI_1(j,i)$ and the second corrected viewpoint image $MI_2(j,i)$ have not only light intensity distribution information but also incident angle information. Therefore, it is possible to generate a refocused image on a virtual image forming surface 610 by first and second processing to be described below.

First Processing (Parallel Movement Processing)

Processing of translating the first corrected viewpoint image $MI_1(j,i)$ to the virtual image forming surface 610 along the principal ray angle $\theta_1$, and translating the second corrected viewpoint image $MI_2(j,i)$ to the virtual image forming surface 610 along the principal ray angle θ2.

Second Processing (Addition Processing)

Processing of adding the first corrected viewpoint image $MI_1(j,i)$ and the second corrected viewpoint image $MI_2(j,i)$ each being translated by the first processing.

Translating the first corrected viewpoint image $MI_1(j,i)$ to the virtual image forming surface 610 along the principal ray angle $\theta_1$ corresponds to a shift of −1 pixel in the column direction. In addition, translating the second corrected viewpoint image $MI_2(j,i)$ to the virtual image forming surface 610 along the principal ray angle $\theta_2$ corresponds to a shift of +1 pixel in the column direction. Therefore, it is possible to generate a refocused signal on the virtual image forming surface 610 by relatively shifting the first corrected viewpoint image $MI_1(j,i)$ and the second corrected viewpoint image $MI_2(j,i)$ by +2 pixels, and adding corresponding $MI_1(j,i)$ and $MI_2(j,i+2)$.

In S7 of FIG. 9, a shift synthesized image which is a refocused image on the virtual image forming surface is generated. An even number closest to a predetermined image shift amount p is expressed as pe. The pe is calculated by pe=2×ROUND(p/2) with ROUND being a rounding function. For the first corrected viewpoint image $MI_1(j,i)$ and the second corrected viewpoint image $MI_2(j,i)$, a shift synthesized image $I_S(j,i)$ is generated by Equation (14).

$$I_S(j,i)=W_1(j,i)\times MI_1(j,i)+W_2(j,i)\times MI_2(j,i-pe). \qquad (14)$$

Equation (14) indicates, simultaneously with the shift addition, calculation to multiply the first corrected viewpoint image $MI_1(j,i)$ by the first weighting factor distribution $W_1(j,i)$ of Equation (13A) and to multiply the second corrected viewpoint image $MI_2(j,i)$ by the second weighting factor distribution $W_2(j,i)$ of Equation (13B). As a result, it is possible to correct a depth of field in a predetermined region. If a depth of field is not corrected, setting may be performed as $W_1 \equiv W_2 \equiv 1$. By multiplying each of a plurality of parallax images by a weighting factor and performing shift synthesis processing, an intermediate image which is a synthesized image of a plurality of viewpoint images is generated.

Shift synthesis processing of the first corrected viewpoint image $MI_1(j,i)$ and the second corrected viewpoint image $MI_2(j,i)$ is not limited to even-numbered shift and addition processing. When necessary, real-numbered shift or more general synthesis processing may also be used. In addition, when necessary, it is possible to omit the processing of S8 in FIG. 9 to be described below. The shift synthesized image $I_S(j,i)$ generated by shifting and adding a plurality of corrected viewpoint images by Equation (14) may be used as an output image.

In the present embodiment, processing of keeping the number of pixels of the shift synthesized image $I_S(j,i)$ generated by Equation (14) at the same number as the number of pixels N of a captured image is performed in advance. In the processing, termination processing for enlarging a data length is performed on a terminal portion of the second corrected viewpoint image $MI_2(j,i)$ in the pupil division direction (the x direction). In the case of pe>0, the termination processing is performed on a terminal column number $i_c (i_{min} \leq i_c \leq i_{min}+pe-1)$ by Equation (15A) with a minimum column number set as $i_{min}$. In the case of pe<0, the termination processing is performed on a terminal column number $i_e (i_{max}+pe+1 \leq i_c \leq i_{max})$ by Equation (15B) with a maximum column number set as $i_{max}$. In the present embodiment, processing of enlarging image sizes of a plurality of corrected viewpoint images is performed.

$$MI_2(j,i_e)=M(j,i_{min}+pe+\mod(i_e-i_{min},2)), (pe>0), \quad (15A)$$

$$MI_2(j,i_e)=M(j,i_{max}+pe-\mod(i_e-i_{max},2)), (pe<0), \quad (15B)$$

Figure 23:
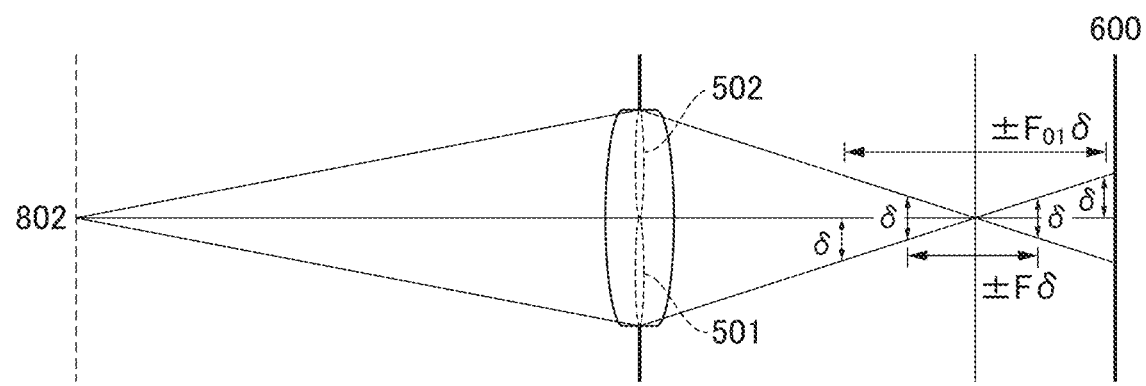
FIG. 23 is a schematic diagram which describes a refocusable range in the first embodiment.

With reference to a schematic diagram of FIG. 23, a re-focusable range by shift synthesis processing in the present embodiment will be described. An imaging element (not shown) is disposed on the imaging surface 600. In the same manner as in the cases of FIGS. 4, 7, and 8, the exit pupil of the image forming optical system is divided into two of the first pupil partial region 501 and the second pupil partial region 502.

A diameter of a permissible circle of confusion is expressed as $\delta$, and a diaphragm value of the image forming optical system is expressed as F. The depth of focus at the diaphragm value F is $\pm F \times \delta$. On the other hand, an effective diaphragm value $F_{01}$ (or $F_{02}$) of the pupil partial region 501 (or 502) divided into $Nx \times Ny = 2 \times 1$ to be narrowed in the pupil division direction (the x direction) is $F_{01} = Nx \times F$ (or $F_{02} = Nx \times F$) and becomes dark. Effective depth of focus for each first corrected viewpoint image (or second corrected viewpoint image) is $\pm Nx \times F \times \delta$, which is Nx times deeper, and a focusing range spreads Nx times. Within a range of the effective depth of focus "$\pm Nx \times F \times \delta$", an in-focus subject image is acquired for each first corrected viewpoint image (or second corrected viewpoint image). Therefore, by performing processing of translating and adding the first corrected viewpoint image (or the second corrected viewpoint image) along the principal ray angle $\theta_1$ (or $\theta_2$) shown in FIG. 22, it is possible to perform refocusing of an in-focus position after photographing.

A defocus amount d from the imaging surface 600 on which an in-focus position can be refocused after photographing is limited. The re-focusable range of the defocus amount d is substantially a range of Equation (16). The diameter of a permissible circle of confusion $\delta$ is defined by $\delta = 2 \cdot \Delta X$ (a reciprocal of a Nyquist frequency $1/(2 \cdot \Delta X)$ of a pixel period $\Delta X$) and the like.

$$|d| \leq N_x F \times \delta. \quad (16)$$

However, as shown in the pupil intensity distribution example in FIG. 6, in a pupil division by a micro lens having a diameter of several μms formed for each pixel section and a photoelectric conversion unit divided into a plurality of parts, a gentle pupil division is performed due to a diffraction blur caused by fluctuation of light. Therefore, the depth of focus of the first viewpoint image and the second viewpoint image in the pupil division direction (the x direction) is not sufficiently deep, and even if a refocused image is generated using the first viewpoint image and the second viewpoint image, a refocusing effect may not be sufficiently obtained in some cases.

Therefore, in the present embodiment, in refocusing using shift synthesis processing, the first sharpening processing is performed for each pixel whose first intensity parameter distribution (image shift difference amount distribution) is 0 or more ($K_{ct}(j,i)=k_{ct} \times M_{DIFF}(j,i) \geq 0$). By Equation (11A), processing of enlarging a difference between a first viewpoint image and a second viewpoint image and sharpening parallax is executed, and a first corrected viewpoint image and a second corrected viewpoint image are generated. As a result, it is possible to increase effective diaphragm values F of a plurality of corrected viewpoint images in the pupil division direction (the x direction), to deeply correct the depth of focus, and to improve the refocusing effect.

Figure 24A:
FIGS. 24A and 24B are diagrams which illustrate refocused images of a conventional embodiment and the first embodiment.
Figure 24B:

With reference to FIGS. 24A and 24B, an effect of the first sharpening processing in refocusing using shift synthesis processing will be described. FIG. 24A shows an example of a refocused image obtained by performing shift synthesis processing on the first viewpoint image and the second viewpoint image before the first sharpening processing in the conventional example. This is an example in which the depth of focus of the first viewpoint image and the second viewpoint image (a plurality of viewpoint images) in the pupil division direction (x direction) is not sufficiently deep because the pupil division is gentle. Refocusing is performed by shift synthesis processing on a captured image in the post-pin state which is focused on the back rather than a right eye of a subject (doll). However, the right eye, the eyelashes, the hair, and the like of the subject (doll) are in a state of small blurring, and thus a sufficient refocusing effect is not obtained. On the other hand, FIG. 24B shows an example of a refocused image by shift synthesis processing of the first corrected viewpoint image and the second corrected viewpoint image after the first sharpening processing in the present embodiment. This is an example in which the effective diaphragm value F of the first corrected viewpoint image and the second corrected viewpoint image in the pupil division direction (the x direction) is large due to the first sharpening processing, and the depth of focus is corrected to be deep. It is known that refocusing using shift synthesis processing is performed, a focus position is re-corrected to match the right eye, the eyelashes, the hair, and the like of a subject (doll) after photographing, and a refocusing effect is improved.

In addition, in the present embodiment, Nx=2, Ny=1, $N_{LF}=2$, the number of pupil division is small, and the number of viewpoint images is small. In such a case, in refocusing using shift synthesis processing, artificial two-line blurring occurs and a boundary of a subject becomes double in a region in which a shift amount (an image shift amount) is increased, image quality may be degraded.

Therefore, in the present embodiment, in the refocusing using shift synthesis processing, first smoothing processing is performed on a first viewpoint image and a second viewpoint image to generate a first corrected viewpoint image and a second corrected viewpoint image. The first smoothing processing according to Equation (11B) is performed for each pixel whose first intensity parameter distribution (an image shift difference amount distribution) is less than 0 ($K_{ct}(j,i)=k_{ct}\times M_{DIFF}(j,i)<0$). The first corrected viewpoint image and the second corrected viewpoint image are generated by processing (crosstalk correction, smoothing) of smoothing parallax by reducing a difference between the first viewpoint image and the second viewpoint image. As a result, it is possible to perform refocusing using shift synthesis processing by suppressing occurrence of artificial two-line blurring and maintaining image quality well in a region in which a shift amount (an image shift amount) is increased.

In step S8 in FIG. 9, sharpening processing and smoothing processing in accordance with the image shift difference amount distribution $M_{DIFF}(j,i)$ are performed on a shift synthesized image (an intermediate image) generated on the basis of a plurality of corrected viewpoint images. In the following, sharpening processing and smoothing processing for a shift synthesized image are referred to as second sharpening processing and second smoothing processing, respectively. Using these types of processing, it is possible to generate an output image subjected to sharp/unsharp control to adaptively control a region with high sharpness and a region with high blurring degree after photographing. In the present embodiment, the second sharpening processing is performed on the shift synthesized image $I_S(j,i)$ in a region in which an image shift difference amount distribution is 0 or more ($M_{DIFF}(j,i)\geq 0$). The second smoothing processing is performed in a region in which an image shift difference amount distribution is less than 0 ($M_{DIFF}(j,i)<0$).

In step S8 in FIG. 9, first, processing of setting a second intensity parameter $k_{USM}$ for specifying an intensity of the second sharpening processing or the second smoothing processing is performed on the shift synthesized image $I_S(j,i)$. Setting is performed as $k_{USM}\geq 0$. Next, calculation processing of an unsharp mask $I_{USM}(j,i)$ is performed. A two-dimensional low-pass filter $\{F_{LPF}(j_{LPF}, i_{LPF})|-n_{LPF}\leq j_{LPF}\leq n_{LPF}, -m_{LPF}\leq i_{LPF}\leq m_{LPF}\}$ is applied to the shift synthesized image $I_S(j,i)$ and $I_{USM}(j,i)$ is calculated according to Equation (17). For the two-dimensional low pass filter $F_{LPF}(j_{LPF},i_{LPF})$, for example, a two-dimensional filter such as $^1[1,0,2,0,1]\times[1,0,2,0,1]$ can be used. When necessary, a two-dimensional Gaussian distribution may also be used.

$$I_{USM}(j,i) = I_S(j,i) - \sum_{j_{LPF}=-n_{LPF}}^{n_{LPF}} \sum_{i_{LPF}=-m_{LPF}}^{m_{LPF}} F_{LPF}(j_{LPF}, i_{LPF}) \times I_S(j+j_{LPF}, i+i_{LPF}). \quad (17)$$

In S8, a refocused image $I_{RF}(j,i)$ which is an output image is finally generated. The unsharp mask $I_{USM}(j,i)$ is applied to the shift synthesized image $I_S(j,i)$ by Equation (18) in accordance with the image shift difference amount distribution $M_{DIFF}F(j,i)$, and the second sharpening processing or the second smoothing processing is performed. In the second sharpening processing and the second smoothing processing, the $I_{USM}(j,i)$ has different signs of coefficient.

$$I_{BF}(j,i)=I_S(j,i)+k_{USM}\times M_{DIFF}(j,i)\times I_{USM}(j,i). \quad (18)$$

In the case of the second sharpening processing, an unsharp mask $I_{USM}(j,i)$ multiplied by a positive coefficient $k_{USM}\times M_{DIFF}(j,i)$ is used in a region in which an image shift difference amount distribution is 0 or more ($M_{DIFF}(j,i)>0$) by Equation (18). In this case, processing of sharpening the shift synthesized image $I_S(j,i)$ in accordance with a magnitude of the image shift difference amount distribution $M_{DIFF}(j,i)$ is performed. On the other hand, in the case of the second smoothing processing, an unsharp mask $I_{USM}(j,i)$ multiplied by a negative coefficient $k_{USM}\times M_{DIFF}(j,i)$ is used in a region in which an image shift difference amount distribution is less than 0 ($M_{DIFF}(j,i)\leq 0$) by Equation (18). In this case, processing of smoothing the shift synthesized image $I_S(j,i)$ in accordance with a magnitude of the image shift difference amount distribution $M_{DIFF}(j,i)$ is performed.

In refocusing using shift synthesis processing, it is possible to perform refocusing based on an optical principle using LF data. Refocusing using shift synthesis processing has an advantage of performing processing even on a region in which an image shift difference amount distribution cannot be detected. However, the pupil division direction is only one direction in the pupil division of the present embodiment (Nx=2, Ny=1, $N_{LF}=2$). If the pupil division direction is only one direction, the refocusing effect is obtained in the x direction (or the y direction) of the pupil division direction, but there is a possibility that the refocusing effect is not sufficiently obtained in the y direction (or x direction) orthogonal to the pupil division direction. On the other hand, in refocusing by sharpening and smoothing in accordance with an image shift difference amount distribution, it is possible to obtain the refocusing effect irrespective of the pupil division direction. In the present embodiment, refocusing processing which combines refocusing using shift synthesis processing and refocusing by sharpening and smoothing in accordance with an image shift difference amount distribution is performed. As a result, it is possible to obtain the refocusing effect even in a direction orthogonal to the pupil division direction.

As described above, in the present embodiment, image processing in accordance with a contrast distribution and an image shift amount distribution, that is, sharpening processing and smoothing processing, is performed on a synthesized image $I_S(j,i)$ generated on the basis of a plurality of corrected viewpoint images to generate an output image.

When necessary, processing of S5, S6, and S7 of FIG. 9 which is refocusing using shift synthesis processing can also be omitted. In this case, image processing of sharpening and smoothing in accordance with a contrast distribution and an image shift amount distribution is performed on a captured image I(i,j) to generate an output image. For the image processing in accordance with a contrast distribution and an image shift amount distribution, sharpening processing, smoothing processing, or combination processing of these may be performed when necessary.

In the present embodiment, image processing such as sharpening or smoothing is performed on a synthesized image of a plurality of corrected viewpoint images (or a captured image) by Equations (7A), (7B), (9), (17), and (18). At this time, image processing such as sharpening or smoothing is performed on a synthesized image (or a captured image) more strongly in a region with a small difference in contrast between respective viewpoint images than in a region with a large difference in contrast. In addition, image processing such as sharpening or smoothing is performed on a synthesized image of a plurality of corrected viewpoint images (or a captured image) more strongly in a region with a large contrast distribution than in a region with a small contrast distribution.

In the present embodiment, sharpening processing is performed in a region with a small difference between an image shift amount distribution and a predetermined shift amount (reference), and smoothing processing is performed in a region with a large difference using Equations (9), (17), and (18). In the present embodiment, sharpening processing is performed more strongly in the region with a small difference between an image shift amount distribution and a predetermined shift amount than in the region with a large difference using Equations (9), (17), and (18). Smoothing processing is performed more strongly in the region with a large difference between an image shift amount distribution and a predetermined shift amount than in the region with a small difference using Equations (9), (17), and (18).

Figure 25:
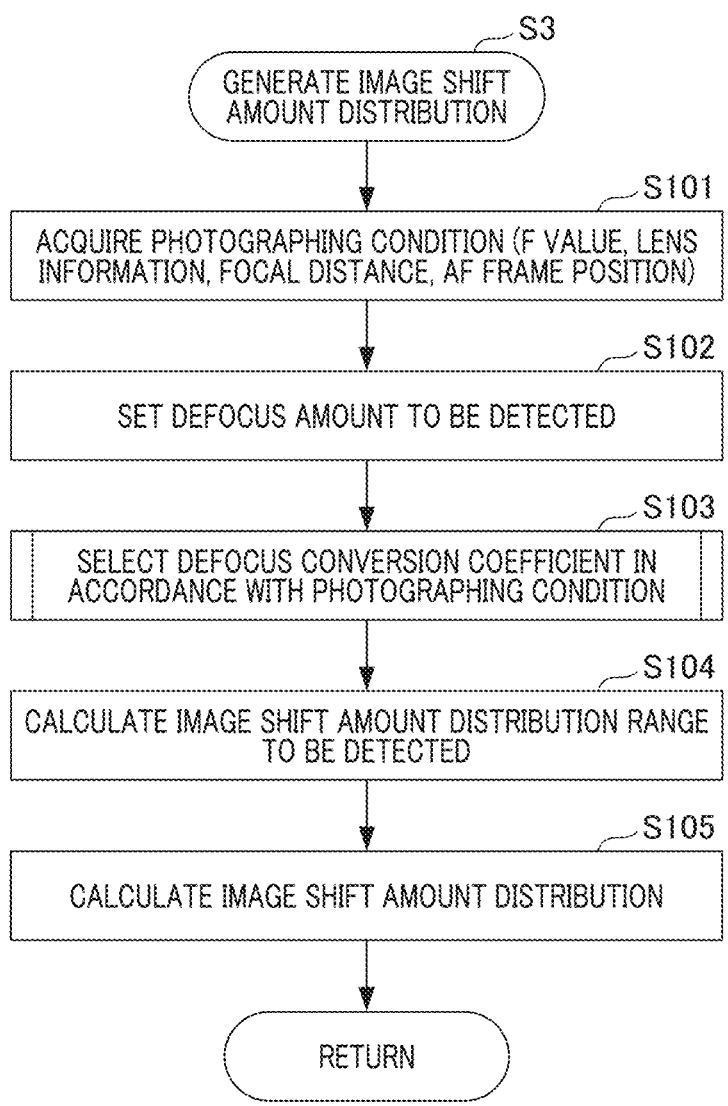
FIG. 25 is a flowchart of image shift amount distribution generation processing in the first embodiment.

Next, with reference to FIG. 25, processing regarding S3 of FIG. 9 (the generation of an image shift amount distribution) will be described. FIG. 25 is a sub-flowchart which shows a processing example of S3 shown in the main flowchart of FIG. 9. The following processing is realized by a program executed by the CPU 121.

In S101, processing of acquiring a photographing condition of an input image is performed. The input image is accompanied by header information in addition to an image. Information on a photographing F value, a photographing lens, and an AF frame position is obtained from the header information, and the procedure proceeds to S102. In S102, processing of setting a defocus amount to be detected as an image shift amount distribution is performed. The defocus amount is specified to be set as a multiple of the depth of focus $\pm F\delta$ on the basis of the diaphragm value F and the diameter of a permissible circle of confusion $\delta$ (for example, 2.2 times a pixel pitch). Since an image shift amount distribution is detected not only in the depth of focus but also outside the depth of focus, and is applied to image processing of a subsequent stage, the image shift amount distribution is detected in a range of the depth of focus or more (for example, $\pm 5F\delta$ to $\pm 10F\delta$). After setting a range of the defocus amount to be detected, the procedure proceeds to S103.

In S103, processing of selecting a defocus conversion coefficient in accordance with a photographing condition is performed. The defocus conversion coefficient is held in a storage unit in an imaging apparatus as table data in advance, or held as header information of an input image file. The defocus conversion coefficient data may also be stored in an image processing apparatus different from an image processing circuit or an imaging apparatus. In the present embodiment, a value of the defocus conversion coefficient data is held for each of an F value, an image height, an exit pupil distance. However, the present invention is not limited thereto, and the value may also be held on the basis of at least one of a focal distance and a subject distance, an F value, an image height (or an AF frame position), an exit pupil distance (lens and sensor information). If information on an F value, a lens, a focal distance, a subject distance, an AF frame position, an F value, an image height, and an exit pupil distance is acquired by reading a photographing condition, and a defocus conversion coefficient is selected, the procedure proceeds to S104.

It is exemplified that the defocus conversion coefficient data is held for each of an F value, an image height, and an exit pupil distance, and a conversion coefficient value may also be held using items other than an F value, an image height, and an exit pupil distance. Alternatively, the conversion coefficient value may also be held for each item of one of an F value, an image height, and an exit pupil distance.

A change of a detection range (a shift amount) in accordance with a specific photographing condition will be described.

A case in which a photographing condition is set to an F value will be considered. If the F value is small, the defocus conversion coefficient decreases due to an increase in the base line length described above. As a result, it is necessary to increase a detection range (a shift amount) to appropriately set a defocus range and a subject distance range. From the above, processing of increasing a detection range (a shift amount) as an F value is smaller is performed. Specifically, as an F value decreases, a detection range (a shift amount) is set to be increased in a stepwise manner.

In addition, a case in which a photographing condition is set to an AF frame position (a coordinate on an imaging surface) or an image height will be considered. If the AF frame position is at a peripheral image height at which an image height is high, a pupil shift occurs as described above, and a defocus conversion coefficient becomes large as a base line length decreases. Therefore, it is necessary to reduce a detection range (a shift amount) to appropriately set a defocus range and a subject distance range. From the above, a detection range (a shift amount) may be reduced in a stepwise manner as the image height of an AF FRAME position increases.

Next, a case in which a photographing condition is a lens ID (identification information) corresponding to the optical characteristics of lens will be considered. In the case of a system that is an imaging optical system in which an exchangeable lens can be detachably attached, since an appropriate detection range also changes as the optical characteristics of lens change, it is necessary to change a detection range in accordance with the optical characteristics of lens. Specifically, if an ID of a mounted lens is acquired on the basis of communication with an exchangeable lens, an exit pupil distance can be known and a difference between the exit pupil distance and a set pupil distance of the imaging element 107 can be known. Since a pupil shift is larger as the difference increases, a detection range may be reduced. Therefore, in the present embodiment, a detection range is changed on the basis of a difference between an exit pupil distance corresponding to a lens ID and the set pupil distance of the imaging element 107.

A case in which a photographing condition is a focal distance and a subject distance will be considered. According to a relationship among the defocus amount and the subject distance described above, and lateral magnification, a subject distance L is proportional to a defocus amount× longitudinal magnification (square of lateral magnification). For this reason, if a detection range (a shift amount) is fixed, a detectable actual distance range is narrow when a subject is at a short distance, and a detectable actual distance range is wide when a subject is at a long distance. From the above, it is necessary to increase a detection range (a shift amount) as a lateral magnification obtained from a focal distance and a subject distance decreases.

As described above, in the present embodiment, it is possible to appropriately set a detection range (a shift amount) on the basis of various types of photographing conditions. A combination of these photographing conditions may also be considered, and at least one photographing condition may be satisfied in the present invention. In S104, the CPU 121 calculates a range of an image shift amount distribution to be detected, and the procedure proceeds to S105. In S105, an image shift amount distribution is calculated within a detection range (a shift amount) determined in S104. If generation processing of an image shift amount distribution is completed, the procedure returns to the processing of the main flow of FIG. 9.

Next, the effect of the present invention will be described. If image processing such as sharpening or smoothing is strongly performed in a region (a mixed region) in which a plurality of subject images with significantly different spatial frequency components are mixed, such as a region in which a perspective conflict or occlusion occur, image quality may be degraded.

In the present embodiment, the following processing will be executed.

(1) Detection Processing of Mixed Region

A contrast difference amount distribution $C_{DIFF}(j,i)$ is generated by Equation (7A) on the basis of a first viewpoint contrast distribution $C_1(j,i)$ and a second viewpoint contrast distribution $C_2(j,i)$, and a mixed region is detected. The contrast difference amount distribution $C_{DIFF}(j,i)$ is a distribution in a range of [0,1], and has a value approaching 0 in a region with a large contrast difference between viewpoint images and many mixtures of subject images having different spatial frequency components. In addition, the contrast difference amount distribution $C_{DIFF}(j,i)$ has a value approaching 1 in a region with a small contrast difference between viewpoint images and few mixtures of subject images having different spatial frequency components.

(2) Generation Processing of Contrast Distribution $M_{CON}(j,i)$

This is processing of multiplying an imaging contrast distribution $C(j,i)$ which is a contrast distribution of a synthesized image obtained from a plurality of viewpoint images by the generated contrast difference amount distribution $C_{DIFF}(j,i)$ according to Equation (7B). A contrast distribution $M_{CON}(j,i)$ in which a value in a mixed region is suppressed to near 0 is generated.

(3) Image Processing of Sharpening or Smoothing

Image processing such as sharpening or smoothing is performed with a relatively low processing intensity on a plurality of viewpoint images or a synthesized image of these viewpoint images on the basis of the generated contrast distribution $M_{CON}(j,i)$ in a region with many mixtures of subject images having different spatial frequency components. In addition, image processing such as sharpening or smoothing is performed with a relatively high processing intensity in a region with few mixtures of subject images having different spatial frequency components.

Therefore, in the present embodiment, it is possible to perform image processing such as sharpening or smoothing while maintaining image quality well using processing of (1) to (3).

In addition, if image processing such as sharpening or smoothing is strongly performed in a low luminance region, image quality may be degraded. In the present embodiment, as shown in a first row of Equation (6A), and Equation (7B), if a luminance value is smaller than a low luminance threshold value Ymin, a value of the contrast distribution $M_{CON}(j,i)$ is set to zero. Accordingly, the contrast distribution $M_{CON}(j,i)$ has higher contrast in a region with high luminance of a captured image than a region with low luminance. The following processing is performed on a plurality of viewpoint images or a synthesized image of these viewpoint images on the basis of the contrast distribution $M_{CON}(j,i)$ to maintain image quality in the region with low luminance well.

Image processing such as sharpening or smoothing is performed with a relatively low processing intensity in a region in which a luminance value is smaller than a low luminance threshold value Ymin.

Image processing such as sharpening or smoothing is performed with a relatively high processing intensity in a region in which a luminance value is equal to or greater than a low luminance threshold value Ymin.

In an image processing method according to the present embodiment, a plurality of viewpoint images are generated for each different pupil partial region on the basis of an input image acquired by an imaging element including a plurality of photoelectric conversion units which receive light fluxes passing through different pupil partial regions of the image forming optical system. A contrast distribution is generated from a captured image and a plurality of viewpoint images, and an image shift amount distribution is generated from the plurality of viewpoint images. In the generation processing of an image shift amount distribution, the detection range of an image shift amount is set using a photographing condition of the input image and a coefficient related to a base line length which is an interval between centers of gravity of different pupil partial regions, and an image shift amount distribution of the detection range is generated from the plurality of viewpoint images. Image processing in accordance with the image shift amount distribution is performed on the captured image, the plurality of viewpoint images, or the synthesized image to generate an output image. According to the present embodiment, it is possible to perform image processing while maintaining image quality well.

Second Embodiment

Next, a second embodiment of the present invention will be described. The same reference numerals as used before will be given to the same configuration elements as in the first embodiment, and thus specific descriptions of these will be omitted and a difference will be mainly described. A way of omitting such description will be the same as in an embodiment to be described later.

Figure 26:
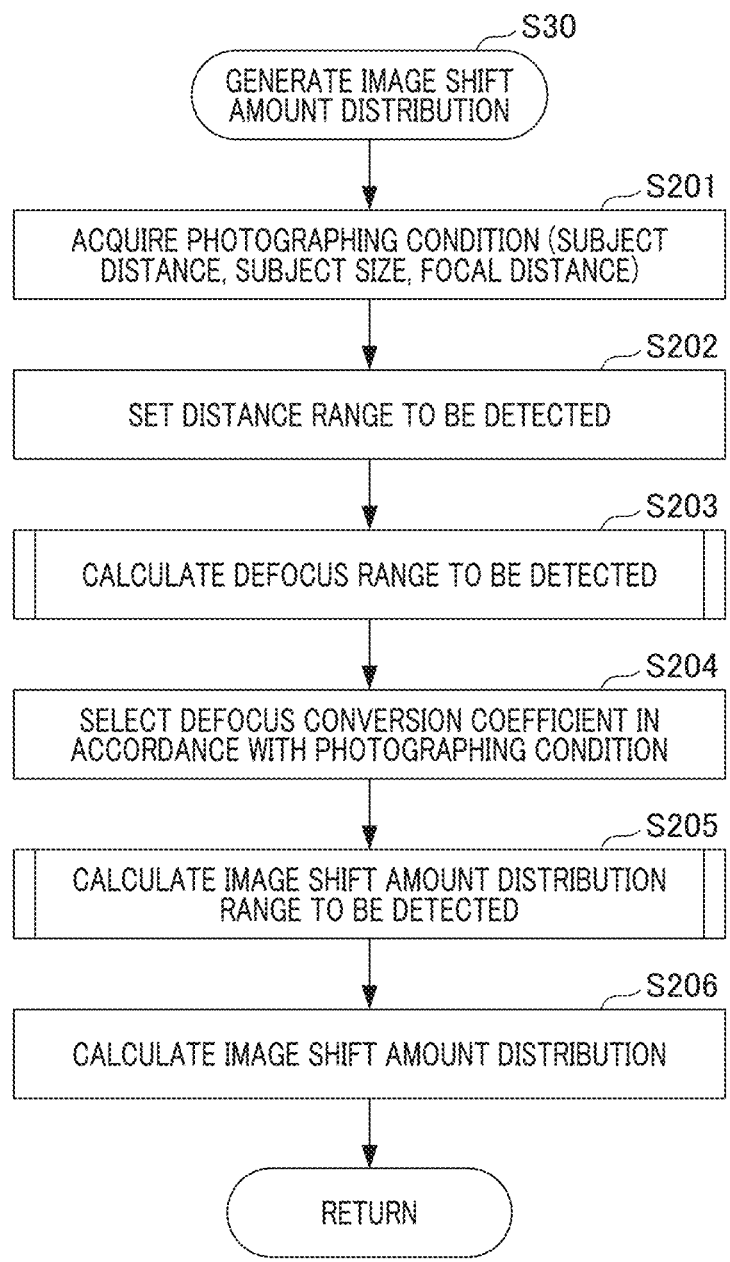
FIG. 26 is a flowchart of image shift amount distribution generation processing in the second embodiment.

In the present embodiment, a detection range of an image shift amount distribution is changed in accordance with a subject distance and a subject size when the image shift amount distribution is generated. Processing of changing the detection range of an image shift amount distribution in accordance with a subject distance and a subject size when the image shift amount distribution is generated after photographing with respect to a captured image from LF data (input image) acquired by the imaging element will be described with reference to FIG. 26.

In the present embodiment, only the generation processing S30 of an image shift amount distribution in the main flowchart of FIG. 9 is different. The generation processing of an image shift amount distribution will be described with reference to a sub-flowchart of FIG. 26. In S201, processing of acquiring an input image photographing condition is performed. An input image is accompanied by header information related to image information. In the header information, a subject distance is acquired from an object distance of the AF frame, a subject size (for example, the number of vertical and horizontal pixels of a face frame) is acquired from a size of the AF frame, information on a focal distance and the like is acquired, and a procedure proceed to S202.

In S202, a distance range to be detected as an image shift amount distribution is set. With regard to a distance range, a detection distance range is set from a subject size around the subject distance acquired in S201. For example, if the number of vertical and horizontal pixels of a face frame is acquired as the subject size, lateral magnification m is calculated on the basis of the subject distance and a focal distance, and horizontal and vertical sizes of a face are calculated. A value obtained by adding the subject distance to the size is set as a maximum value of the distance range of an image shift amount distribution.

In S203, a defocus range to be detected is calculated. In S204, a defocus conversion coefficient in accordance with a photographing condition is selected. The defocus conversion coefficient has been already described in S103 of FIG. 25. In S205, a range of an image shift amount distribution to be detected is calculated. A maximum value and a minimum value of the detection range of an image shift amount distribution are calculated and the detection range of an image shift amount distribution is determined according to a maximum value and a minimum value of the distance range to be detected. In S206, an image shift amount distribution is calculated in the detection range (shift amount) determined in S205. If generation processing of an image shift amount distribution is completed, the procedure returns to the processing of the main flowchart of FIG. 9.

In the present embodiment, it is possible to change the detection range of an image shift amount distribution in accordance with a subject distance and a subject size when the image shift amount distribution is generated after photographing, and to perform image processing such as sharpening or smoothing while maintaining image quality well.

Third Embodiment

Figure 27:
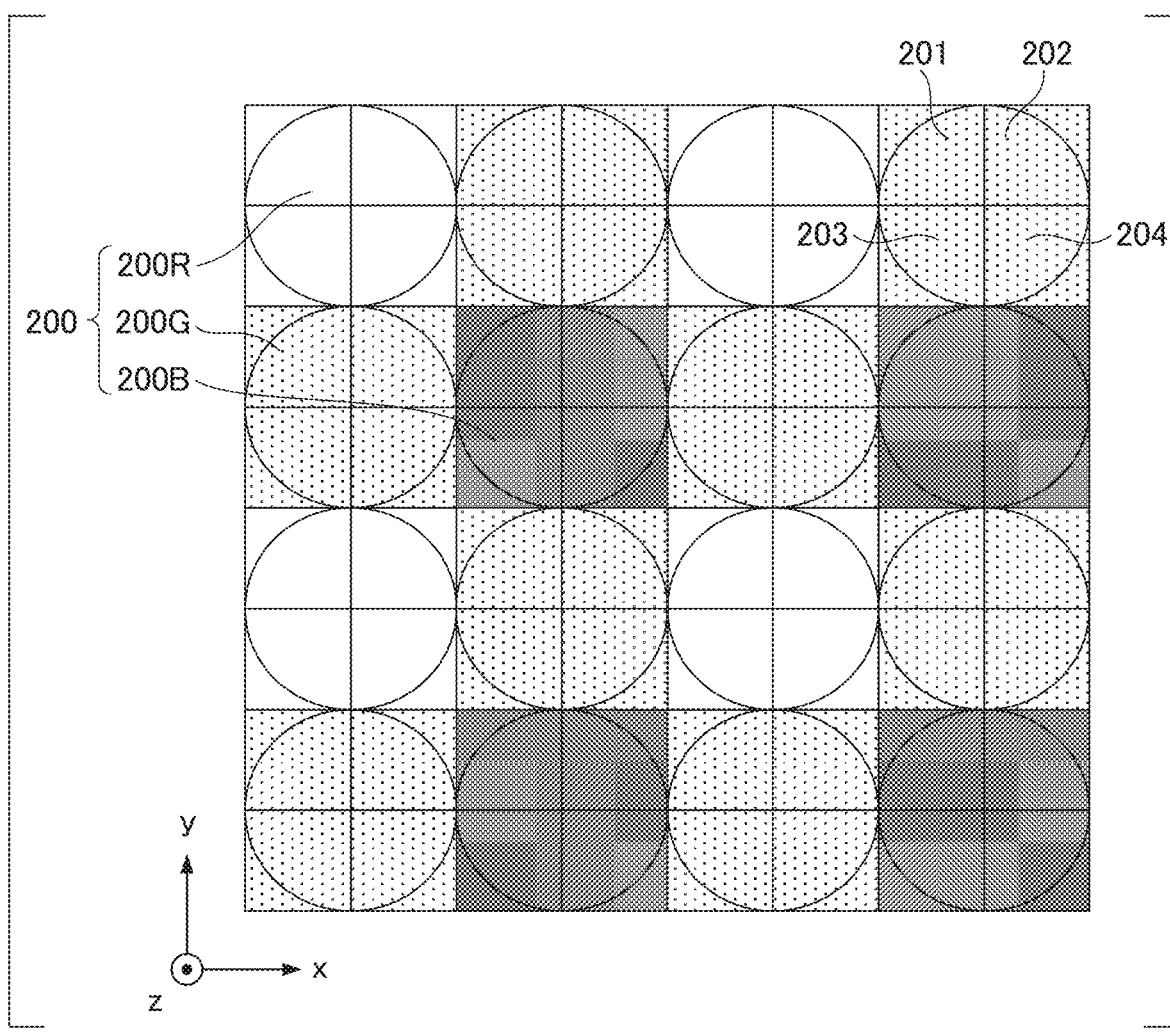
FIG. 27 is a schematic diagram of a pixel array in a third embodiment.

Next, a third embodiment of the present invention will be described. FIG. 27 is a schematic diagram of a pixel array of imaging elements in the present embodiment. A horizontal direction of FIG. 27 is defined as an x direction (a horizontal direction), a vertical direction is defined as a y direction (a vertical direction), and a direction orthogonal to the x direction and the y direction (a direction perpendicular to a paper surface) is defined as a z direction (an optical axis direction). FIG. 27 shows an imaging pixel array of a two-dimensional CMOS sensor of the present embodiment in a range of 4 columns×4 rows, and shows a sub-pixel array in a range of 8 columns×8 rows.

A difference from FIG. 2 is that each pixel is divided into two parts in the x direction, and is divided into two parts in the y direction. That is, the number of divisions $N_{LF}$ is 4, and each pixel is constituted by a first sub-pixel 201 to a fourth sub-pixel 204.

In an example shown in FIG. 27, it is possible to acquire an input image for generating a captured image and a viewpoint image with the number of divisions of 4 by disposing a large number of 4 columns×4 rows of pixels (8 columns×8 rows of sub-pixels) on a surface. In the imaging element of the present embodiment, a period P of pixels is set to 4 µm (micrometer), and the number of pixels N is set to 5575 horizontal columns×3725 vertical rows=approximately 20.75 million pixels. Furthermore, a period $P_S$ of sub-pixels is set to 2 µm, and the number of sub-pixels $N_s$ is set to 11150 horizontal columns×7450 vertical rows=about 83 million pixels.

FIG. 28A is a plan view of one pixel 200G in the imaging element shown in FIG. 27 as seen from a light receiving surface side (+z side) of the imaging element. The axis in a direction perpendicular to a paper surface of FIG. 28A is defined as a z axis, and the front side is defined as a positive direction of the z axis. Moreover, a y axis is set in a vertical direction orthogonal to the z axis, the upward direction is defined as a positive direction of the y axis, the x axis is set in a horizontal direction orthogonal to the z axis and the y axis, and the right direction is defined as a positive direction of the x axis. FIG. 28B is a cross-sectional view taken along the line a-a in FIG. 28A and seen from a −y side.

As shown in FIGS. 28A and 28B, a microlens 305 for collecting incident light is formed on a light receiving surface side (+z direction) of each pixel in the pixel 200G Furthermore, a first photoelectric conversion unit 301 to a fourth photoelectric conversion unit 304 of the number of divisions of 4 with Nx=2 and Ny=2 are formed. The first photoelectric conversion unit 301 to the fourth photoelectric conversion unit 304 correspond to the first sub-pixel 201 to the fourth sub-pixel 204, respectively.

In S1 of FIG. 9 in the present embodiment, a viewpoint image is generated for each of four different pupil partial regions of the image forming optical system on the basis of LF data (input image) acquired by the imaging element. A captured image in accordance with a pupil region obtained by synthesizing different pupil partial regions of the image forming optical system is generated. First, LF data (input image) acquired by the imaging element is input, or LF data which has been photographed and stored in a recording medium is read and input.

In S1, next, the first sub-pixel 201 to the fourth sub-pixel 204 are generated for each of different pupil partial regions of the image forming optical system. A sub-pixel signal on an $i_s^{th}$ ($1 \leq i_s \leq 2$) column and a $j_s^{th}$ ($1 \leq j_s \leq 2$) row in each pixel signal of LF data is expressed by $k=2\cdot(j_s-1)+i_s$ ($1 \leq k \leq 4$) as a $k^{th}$ sub-pixel signal. A $k^{th}$ viewpoint image Ik(j,i) on an $i^{th}$ column and a $j^{th}$ row, which corresponds to a $k^{th}$ pupil partial region of the image forming optical system is generated by Equation (1).

In the present embodiment, a specific sub-pixel signal is selected from the first sub-pixel 201 to the fourth sub-pixel 204 obtained by division into four for each pixel on the basis of the LF data corresponding to the pixel array exemplified in FIG. 27. As a result, a first viewpoint image to a fourth viewpoint image which are RGB signals of Bayer array having a resolution of the number of pixels N and correspond to the specific pupil partial region among a first pupil partial region to a fourth pupil partial region of the image forming optical system are generated.

In S1 of FIG. 9, next, a captured image in accordance with a pupil region obtained by synthesizing different pupil partial regions of the image forming optical system is generated. A captured image I(j,i) on an $i^{th}$ column and a $j^{th}$ row is generated by Equation (2). By synthesizing all signals of the first sub-pixel 201 to the fourth sub-pixel 204 obtained by a division into four for each pixel on the basis of an input image corresponding to the pixel array shown in FIG. 27, a captured image which is an RGB signal of a Bayer array having a resolution of the number of pixels N is generated.

In S2 of FIG. 9, processing of extracting a high frequency band component of a spatial frequency for each region is performed on the basis of the captured image and the plurality of viewpoint images of the present embodiment, respectively, and a contrast distribution is generated. The contrast distribution is adjusted in accordance with a difference between viewpoint images. First, color centers of gravity of respective RGB colors are matched at each position (j,i) on the basis of the captured image I(j,i) which is an RGB signal of the Bayer array, and an imaging luminance signal Y is generated by Equation (3A). In the same manner, the $k^{th}$ viewpoint luminance signal Yk is generated by Equation (3B) on the basis of the $k^{th}$ viewpoint image Ik(k=1 to 4) which is an RGB signal of the Bayer array.

In S2, next, a high frequency imaging signal dY(j,i) is generated by Equation (4A) from an imaging luminance signal Y(j,i) using a two-dimensional band pass filter. In the same manner, a $k^{th}$ viewpoint high frequency signal dYk(j,i) is generated by Equation (4B) from a $k^{th}$ viewpoint luminance signal Yk(j,i) (k=1 to 4).

In the present embodiment. Nx=2, Ny=2, and $N_{LF}$=4. Both the x direction and the y direction are pupil division directions. The two-dimensional band pass filter is constituted as $F_{BPF}(j_{BPF}, i_{BPF})=Fy(j_{BPF}) \times Fx(i_{BPF})$ by a direct product of a one-dimensional filter Fx ($i_{BPF}$) in the x direction and a one-dimensional filter Fy ($j_{BPF}$) in the y direction. The one-dimensional filter Fx($i_{BPF}$) extracts the high frequency component of a spatial frequency in the x direction. For example, a one-dimensional bandpass filter having a coefficient value of 0.5×[1,2,0,−2,−1]+1.5×[1,0,−2,0,1] or the like can be used. In the same manner, a one-dimensional filter Fy($j_{BPF}$) in the y direction which is one of the pupil division directions extracts the high frequency component of a spatial frequency in the y direction. For example, a one-dimensional bandpass filter having a coefficient value of 0.5×[1,2,0,−2,−1]+1.5×[1,0,−2,0,1] or the like can be used. In the present embodiment, a two-dimensional band pass filter constituted by a direct product of two one-dimensional filters is exemplified, but the present invention is not limited thereto, and a general two-dimensional band pass filter can be used.

In S2, next, a normalized high frequency imaging signal dZ(j,i) is generated. In Equation (5A), $Y_0$>0, and processing of normalizing the high frequency imaging signal dY(j,i) by the imaging luminance signal Y(j,i) is performed. In the same manner, a normalized $k^{th}$ viewpoint high frequency signal dZk(j,i) obtained by normalizing the $k^{th}$ viewpoint high frequency signal dYk(j,i) (k=1 to $N_{LF}$) by the $k^{th}$ viewpoint luminance signal Yk(j,i) is generated by Equation (5B). When necessary, high frequency cut (low-pass) filter processing may be performed on the image luminance signal Y(j,i) and the $k^{th}$ viewpoint luminance signal Yk(j,i) before normalization by Equations (5A) and (5B) to suppress high frequency noise.

In S2, next, an imaging contract distribution C(j,i) is generated by Equation (6A) on the basis of the low luminance threshold value Ymin, the contrast maximum threshold value Cmax, and the exponent y. In the same manner, the $k^{th}$ viewpoint contract distribution Ck(j,i) (k=1 to 4) is generated by Equation (6B).

In S2, next, the contrast difference amount distribution $C_{DIFF}$(j,i) is generated. $C_{DIFF}$(j,i) is generated by the following Equation (19) using the first viewpoint contrast distribution $C_1$(j,i) to the fourth viewpoint contrast distribution $C_4$(j,i) to detect a mixed region of a plurality of subject images having different spatial frequency components. Next, the imaging contrast distribution C(j,i) is multiplied by the contrast difference amount distribution $C_{DIFF}$(j,i) according to Equation (7B). As a result, a contrast distribution $M_{CON}$(j,i) whose value is suppressed to near 0 in the mixed region of a plurality of subject images having different spatial frequency components is generated.

$$C_{DIFF}(j, i) = 1 - \max_{1 \le k1 < k2 \le N_{LF}} (|C_{k1}(j, i) - C_{k2}(j, i)|). \quad (19)$$

The contrast difference amount distribution $C_{DIFF}$(j,i) is a distribution of the range of [0,1]. The contrast distribution $M_{CON}$(j,i), with respect to the imaging contrast distribution C(j,i), is a distribution whose value is suppressed to near 0 in the mixed region of a plurality of subject images having different spatial frequency components.

Processing in S3, S30, and thereafter in FIG. 9 are the same as in the first embodiment and the second embodiment.

In the present embodiment, each pixel includes four-divided photoelectric conversion units, and it is possible to perform processing such as sharpening or smoothing while maintaining image quality well.

The photoelectric conversion units in each pixel of the imaging element can be applied to embodiments in which the number of divisions is further increased. For example, it is possible to perform divisions of $N_{LF}$=9 with Nx=3 and Ny=3, division of $N_{LF}$=16 with Nx=4 and Ny=4, and the like. The processing described above is not limited to Nx=Ny, and can be applied to a case of an arbitrary division number $N_{LF}$=Nx×Ny.

Although preferred embodiments of the present invention have been described above, the present invention is not limited to these embodiments, and various modifications and changes can be made within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-134707, filed Jul. 10, 2017, which is hereby incorporated by reference wherein in its entirety.

What is claimed is:

1. An image processing apparatus comprising:
one or more processors; and
a memory storing instructions which, when the instructions are executed by the one or more processors, cause the image processing apparatus to function as units comprising:
an acquisition unit configured to acquire a plurality of viewpoint images with different viewpoints;
a first generation unit configured to set a detection range of an image shift amount of the plurality of viewpoint images on the basis of a photographing condition and to generate distribution information based on the detection range using the plurality of viewpoint images; and
a second generation unit configured to perform image processing using the generated distribution information and to generate an output image,
wherein the first generation unit decreases the detection range as an image height increases,
wherein the second generation unit generates refocused images by generating viewpoint images which are corrected by performing sharpening or smoothing processing on the plurality of viewpoint images and performing shift synthesis thereon.

2. The image processing apparatus according to claim 1, wherein the acquisition unit acquires the plurality of viewpoint images from an imaging element including a plurality of photoelectric conversion units each receiving light fluxes passing through different pupil partial regions of an image forming optical system; and
the first generation unit generates the distribution information using a coefficient related to a base line length which is an interval between centers of gravity of the different pupil partial regions.

3. The image processing apparatus according to claim 2, wherein the photographing condition is one or more of a diaphragm value of the image forming optical system, the image height, and a lens ID which is identification information.

4. The image processing apparatus according to claim 3, wherein the first generation unit increases the detection range as the diaphragm value decreases.

5. The image processing apparatus according to claim 3, wherein the first generation unit sets a range of a defocus amount as the detection range according to a focal distance and a subject distance.

6. The image processing apparatus according to claim 2, wherein the photographing condition is a subject distance or a magnitude of a size.

7. The image processing apparatus according to claim 6, wherein the first generation unit sets the detection range on the basis of the subject distance and the size of a subject.

8. The image processing apparatus according to claim 1, wherein the first generation unit selects a conversion coefficient from an image shift amount to a defocus amount, which corresponds to the photographing condition.

9. The image processing apparatus according to claim 8, wherein the first generation unit acquires the conversion coefficient corresponding to a diaphragm value of the image forming optical system, an image height, or an exit pupil distance.

10. The image processing apparatus according to claim 1, wherein the second generation unit generates viewpoint images which are corrected by performing first sharpening or smoothing processing on the plurality of viewpoint images, and generates the output images by performing second sharpening or smoothing processing on synthesized images generated from the corrected viewpoint images.

11. The image processing apparatus according to claim 1, wherein the detection range is a range in which the first generation unit calculates correlation among the plurality of viewpoint images.

12. An image processing apparatus comprising:
one or more processors; and
a memory storing instructions which, when the instructions are executed by the one or more processors, cause the image processing apparatus to function as units comprising:
an acquisition unit configured to acquire a plurality of viewpoint images with different viewpoints; and
a first generation unit configured to set a detection range of an image shift amount of the plurality of viewpoint images on the basis of a photographing condition and to generate distribution information based on the detection range using the plurality of viewpoint images,
wherein the first generation unit changes the detection range according to a difference between an exit pupil distance corresponding to a lens ID and a set pupil distance of the imaging element.

13. The image processing apparatus according to claim 12, further comprising:
a second generation unit configured to perform image processing using the generated distribution information and to generate an output image.

14. An image processing apparatus comprising:
one or more processors; and
a memory storing instructions which, when the instructions are executed by the one or more processors, cause the image processing apparatus to function as units comprising:
an acquisition unit configured to acquire a plurality of viewpoint images with different viewpoints; and
a first generation unit configured to set a detection range of an image shift amount of the plurality of viewpoint images on the basis of a photographing condition and to generate distribution information based on the detection range using the plurality of viewpoint images,
wherein the first generation unit selects a conversion coefficient from an image shift amount to a defocus amount, which corresponds to the photographing condition, and
wherein the first generation unit acquires the conversion coefficient from a storage unit or from header information of an image file.

15. The image processing apparatus according to claim 14, further comprising:
a second generation unit configured to perform image processing using the generated distribution information and to generate an output image.

16. An imaging apparatus which includes an image processing apparatus, an image forming optical system, and an imaging element, the imaging apparatus comprising:
one or more processors; and
a memory storing instructions which, when the instructions are executed by the one or more processors, cause the image processing apparatus to function as units comprising:
an acquisition unit configured to acquire a plurality of viewpoint images with different viewpoints;
a first generation unit configured to set a detection range of an image shift amount of the plurality of viewpoint images on the basis of a photographing condition, and to generate distribution information based on the detection range using the plurality of viewpoint images; and a second generation unit configured to perform image processing using the generated distribution information and to generate an output image, wherein the first generation unit decreases the detection range as an image height increases, wherein the second generation unit generates refocused images by generating viewpoint images which are corrected by performing sharpening or smoothing processing on the plurality of viewpoint images and performing shift synthesis thereon.

17. The imaging apparatus according to claim 16, wherein the imaging element includes a plurality of microlens and a plurality of photoelectric conversion units corresponding to respective microlenses, and the plurality of viewpoint images are acquired by the plurality of photoelectric conversion units.

18. The imaging apparatus according to claim 16, further comprising:

a control unit configured to calculate a defocus amount based on the plurality of viewpoint images and to control focus adjustment.

19. An image processing method executed by an image processing apparatus which generates output images by performing image processing on a plurality of viewpoint images with different viewpoints, the method comprising:

a process of acquiring the plurality of viewpoint images;

a first generation process of setting a detection range of an image shift amount of the plurality of viewpoint images on the basis of a photographing condition and generating distribution information based on the detection range using the plurality of viewpoint images; and a second generation process of performing image processing using the generated distribution information and to generate an output image, wherein, in the first generation process, decreasing the detection range as an image height increases, wherein, in the second generation process, generating refocused images by generating viewpoint images which are corrected by performing sharpening or smoothing processing on the plurality of viewpoint images and performing shift synthesis thereon.

20. A non-transitory recording medium storing a control program of an image processing apparatus causing a computer to perform each step of a control method of the image processing apparatus, the method comprising:

a process of acquiring the plurality of viewpoint images;

a first generation process of setting a detection range of an image shift amount of the plurality of viewpoint images on the basis of a photographing condition and generating distribution information based on the detection range using the plurality of viewpoint images; and a second generation process of performing image processing using the generated distribution information and to generate an output image, wherein, in the first generation process, decreasing the detection range as an image height increases, wherein, in the second generation process, generating refocused images by generating viewpoint images which are corrected by performing sharpening or smoothing processing on the plurality of viewpoint images and performing shift synthesis thereon.

* * * * *